United States Patent
Kitani et al.

(10) Patent No.: US 7,421,742 B2
(45) Date of Patent: Sep. 2, 2008

(54) SIGNAL PROCESSING SYSTEM, RECORDING METHOD, PROGRAM, RECORDING MEDIUM, REPRODUCTION DEVICE AND INFORMATION PROCESSING DEVICE

(75) Inventors: Satoshi Kitani, Tokyo (JP); Katsumi Muramatsu, Tokyo (JP)

(73) Assignee: Sony Corporation, Tokyo (JP)

( * ) Notice: Subject to any disclaimer, the term of this patent is extended or adjusted under 35 U.S.C. 154(b) by 647 days.

(21) Appl. No.: 10/505,174

(22) PCT Filed: Dec. 26, 2003

(86) PCT No.: PCT/JP03/16937

§ 371 (c)(1),
(2), (4) Date: Aug. 31, 2004

(87) PCT Pub. No.: WO2004/064314

PCT Pub. Date: Jul. 29, 2004

(65) Prior Publication Data

US 2005/0089165 A1 Apr. 28, 2005

(30) Foreign Application Priority Data

Jan. 15, 2003 (JP) .............................. 2003-006916

(51) Int. Cl.
G06F 7/00 (2006.01)

(52) U.S. Cl. .............................. 726/31; 726/32; 726/33; 713/158; 713/169; 713/170

(58) Field of Classification Search ................. 713/158, 713/169–170; 726/32–33, 31
See application file for complete search history.

(56) References Cited

U.S. PATENT DOCUMENTS 6,151,394 A * 11/2000 Tatebayashi et al. ........ 380/283

(Continued)

FOREIGN PATENT DOCUMENTS

JP 9-190667 7/1997

(Continued)

Primary Examiner—Emmanuel L Moise
Assistant Examiner—Paul Callahan
(74) Attorney, Agent, or Firm—Oblon, Spivak, McClelland, Maier & Neustadt, P.C.

(57) ABSTRACT

A signal processing system includes a reproducing apparatus for reading information from a recording medium having unique information and an information processing apparatus for mutually authenticating and connecting the reproducing apparatus. The reproducing apparatus includes a final encryption key generating portion that generates a content information encryption key in accordance with intermediate key information. A first transmitting portion transmits the intermediate key information to the information processing apparatus. A second transmitting portion transmits the content information encryption key to the information processing apparatus. The information processing apparatus includes a content information encrypting portion that encrypts content information using the content information encryption key, and an intermediate key information encrypting portion that encrypts the intermediate key information using key information unique to the recording medium. A recording portion records the encrypted content information and the encrypted intermediate key information to the recording medium.

13 Claims, 13 Drawing Sheets

U.S. PATENT DOCUMENTS

| | | | | |
|---|---|---|---|---|
| 6,615,192 | B1 * | 9/2003 | Tagawa et al. | 705/57 |
| 6,993,135 | B2 * | 1/2006 | Ishibashi | 380/277 |
| 7,017,100 | B2 * | 3/2006 | Kojima et al. | 714/755 |
| 2001/0021255 | A1 * | 9/2001 | Ishibashi | 380/277 |
| 2002/0123968 | A1 * | 9/2002 | Okayama et al. | 705/57 |
| 2002/0164034 | A1 * | 11/2002 | Asano et al. | 380/278 |
| 2002/0176575 | A1 * | 11/2002 | Qawami et al. | 380/201 |
| 2002/0186842 | A1 * | 12/2002 | Sabet-Sharghi et al. | 380/200 |
| 2003/0016826 | A1 * | 1/2003 | Asano et al. | 380/277 |
| 2004/0030902 | A1 * | 2/2004 | Asano et al. | 713/176 |
| 2004/0172549 | A1 * | 9/2004 | Kojima et al. | 713/193 |
| 2005/0081047 | A1 * | 4/2005 | Kitani | 713/193 |
| 2006/0026444 | A1 * | 2/2006 | Asano et al. | 713/193 |
| 2006/0123319 | A1 * | 6/2006 | Kojima et al. | 714/758 |

FOREIGN PATENT DOCUMENTS

| | | |
|---|---|---|
| JP | 11-66706 | 3/1999 |
| JP | 2000-100069 | 4/2000 |
| JP | 2004186825 A * | 7/2004 |

* cited by examiner

SIGNAL PROCESSING SYSTEM, RECORDING METHOD, PROGRAM, RECORDING MEDIUM, REPRODUCTION DEVICE AND INFORMATION PROCESSING DEVICE

BACKGROUND OF THE INVENTION

1. Field of the Invention

The present invention relates to a signal processing system, a recording method, a program, a recording medium, a reproducing apparatus, and an information processing apparatus that cause a drive connected to for example a personal computer to record an encrypted content to a disc medium and to reproduce an encrypted content from a disc medium.

2. Discussion of the Background

On one recording medium such as a DVD (Digital Versatile Disc), which has been recently developed, a large capacity of data for one movie can be recorded as digital information. When video information and so forth can be recorded as digital information, it will become important to protect copyright of digital information against illegal copies.

In DVD-Video, as a copy protection technology, CSS (Content Scrambling System) has been employed. The use of the CSS is permitted for only DVD-ROM media, not recordable DVDs such as a DVD-R, a DVD-RW, a DVD+R, a DVD+RW, and so forth due to CSS contract. Thus, the CSS contract does not permit the user to copy the contents of a DVD-Video disc that has been copyright-protected in accordance with the CSS system to a recordable DVD (so-called bit-by-bit copy).

However, there was a serious situation of which the CSS encrypting system was broken. Illegal software called "DeCSS" that is capable of easily decrypting contents that has been encrypted in accordance with the CSS encryption system and copying the decrypted contents to a hard disk was published on the Internet. As a background of the advent of "DeCSS", reproduction software was designed with a CSS decryption key that was not anti-tampered although it was supposed to be anti-tampered. The reproduction software was reverse-engineered and the encryption key was decrypted. As a result, all the CSS algorithm was decrypted.

As a successor of the CSS, CPPM (Content Protection for Pre-Recorded Media) as a copyright protection technology for DVD-ROMs such as a DVD-Audio disc and CPRM (Content Protection for Recordable Media) as a copyright protection technology for recordable DVDs and memory cards have been proposed. In these systems, even if there is a problem about encryption for contents, storage of management information, and so forth, the systems can be updated. Even if data of a whole disc is copied, the reproduction can be restricted. A method for protecting copyright for DVDs is described in the following non-patent related art reference 1. The CPRM is described in the following document distributed by its licenser, 4C Entity, LLC, USA.

"Spreading-out Copyright Protection Space Starting from DVD", Yamada, Nikkei Electronics, pp. 143-153, 2001.8.13.

"Content Protection for Recordable Media Specification DVD Book", Internet <URL: http://www.4Centrity.com/>

SUMMARY OF THE INVENTION

In a personal computer (hereinafter, sometimes abbreviated as PC) environment, since a PC and a drive are connected with a standard interface, secret data may be leaked out or tampered at the standard interface. As a result, there is a risk of which application software may be reverse-engineered and secret information may be stolen or tampered. Such a risk hardly occurs in an electronic apparatus that has a recording and reproducing apparatus that is integrated thereinto.

When a copyright protection technology is implemented to an application program that is executed on a PC, to prevent the copyright protection technology from being analyzed, the application program is generally anti-tampered. However, there is no index that represents the strength of tamper-resistance. As a result, countermeasures against reverse-engineering depend on the decision and capability of each implementer. Thus, the CSS was broken. The copyright protecting technologies CPPM and CPRM for recordable DVDs, which were proposed as a successor of the CSS are based on the known CSS and have new additional functions. In addition, most of algorithms of copyright protection technologies depend on implementation to a PC. Thus, it cannot be said that they have strong content protection functions. In other words, an encrypting system would be broken by analyzing secret information of a copyright protection technology for example reverse-engineering using application software. Encrypted content read as data from a disc by a PC would be decrypted by decrypting software such as "DeCSS". The decrypted data would be repeatedly copied as a clear content in non-copy-protection state. Thus, there was a risk of which the copyright protection would not work.

An object of the present invention is to provide a mutual authenticating method, a program, a recording medium, a signal processing system, a reproducing apparatus, and an information processing apparatus that allow safety of a copyright protection technology in a PC environment to be secured.

To solve the foregoing problem, a first aspect of the present invention is a signal processing system having a reproducing apparatus for reading information from a recording medium having information unique thereto and an information processing apparatus for mutually authenticating and connecting the reproducing apparatus through a transferring portion, wherein the reproducing apparatus comprises:

final encryption key generating means for generating a content information encryption key in accordance with intermediate key information;

a first transmitting portion for transmitting the intermediate key information to the information processing apparatus through the transferring portion; and a second transmitting portion for transmitting the content information encryption key to the information processing apparatus through the transferring portion, and wherein the information processing apparatus comprises:

a content information encrypting portion for encrypting content information using the content information encryption key;

an intermediate key information encrypting portion for encrypting the intermediate key information using key information unique to the recording medium, the key information being generated in accordance with information unique to the recording medium; and a recording portion for recording the encrypted content information and the encrypted intermediate key information to the recording medium.

A second aspect of the present invention is a recording method of a reproducing apparatus and an information processing apparatus for recording information to a recording medium, the reproducing apparatus being configured to read information from the recording medium having information unique thereto and the information processing apparatus being configured to mutually authenticate and connect the reproducing apparatus through a transferring portion, the recording method comprising the steps of:

causing the reproducing apparatus to generate a content information encryption key in accordance with intermediate key information;

causing the reproducing apparatus to transmit the intermediate key information to the information processing apparatus through the transferring portion;

causing the reproducing apparatus to transmit the content information encryption key to the information processing apparatus through the transferring portion;

causing the information processing apparatus to encrypt content information using the content information encryption key;

causing the information processing apparatus to encrypt the intermediate key information using key information unique to the recording medium, the key information being generated in accordance with information unique to the recording medium; and causing the information processing apparatus to record the encrypted content information and the encrypted intermediate key information to the recording medium.

A third aspect of the present invention is a program of a reproducing apparatus and an information processing apparatus for recording information to a recording medium, the reproducing apparatus being configured to read information from the recording medium having information unique thereto and the information processing apparatus being configured to mutually authenticate and connect the reproducing apparatus through a transferring portion, the program comprising the steps of:

causing the reproducing apparatus to generate a content information encryption key in accordance with intermediate key information;

causing the reproducing apparatus to transmit the intermediate key information to the information processing apparatus through the transferring portion;

causing the reproducing apparatus to transmit the content information encryption key to the information processing apparatus through the transferring portion;

causing the information processing apparatus to encrypt content information using the content information encryption key;

causing the information processing apparatus to encrypt the intermediate key information using key information unique to the recording medium, the key information being generated in accordance with information unique to the recording medium; and causing the information processing apparatus to record the encrypted content information and the encrypted intermediate key information to the recording medium.

A fourth aspect of the present invention is a recording medium for storing a program of a reproducing apparatus and an information processing apparatus for recording information to a recording medium, the reproducing apparatus being configured to read information from the recording medium having information unique thereto and the information processing apparatus being configured to mutually authenticate and connect the reproducing apparatus through a transferring portion, the program comprising the steps of:

causing the reproducing apparatus to generate a content information encryption key in accordance with intermediate key information;

causing the reproducing apparatus to transmit the intermediate key information to the information processing apparatus through the transferring portion;

causing the reproducing apparatus to transmit the content information encryption key to the information processing apparatus through the transferring portion;

causing the information processing apparatus to encrypt content information using the content information encryption key;

causing the information processing apparatus to encrypt the intermediate key information using key information unique to the recording medium, the key information being generated in accordance with information unique to the recording medium; and causing the information processing apparatus to record the encrypted content information and the encrypted intermediate key information to the recording medium.

A fifth aspect of the present invention is a reproducing apparatus, connected to an information processing apparatus through a transferring portion, for reading information from a recording medium having information unique thereto, the reproducing apparatus comprising:

final encryption key generating means for generating a content information encryption key in accordance with intermediate key information;

a first transmitting portion for transmitting the intermediate key information to the information processing apparatus through the transferring portion;

a second transmitting portion for transmitting the content information encryption key to the information processing apparatus through the transferring portion, wherein the reproducing apparatus is mutually authenticated with the information processing apparatus and connected thereto, the information processing apparatus comprising a content information encrypting portion for encrypting content information using the content information encryption key; an intermediate key information encrypting portion for encrypting the intermediate key information using key information unique to the recording medium, the key information being generated in accordance with information unique to the recording medium; and a recording portion for recording the encrypted content information and the encrypted intermediate key information to the recording medium.

A sixth aspect of the present invention is an information processing apparatus connected to a reproducing apparatus through a transferring portion, the reproducing apparatus being configured to read information from a recording medium having information unique thereto, the information processing apparatus being mutually authenticated with the reproducing apparatus and connected thereto through the transferring portion, the reproducing apparatus comprising final encryption key generating means for generating a content information encryption key in accordance with intermediate key information; a first transmitting portion for transmitting the intermediate key information to the information processing apparatus through the transferring portion; and a second transmitting portion for transmitting the content information encryption key to the information processing apparatus through the transferring portion, the information processing apparatus comprising:

a content information encrypting portion for encrypting content information using the content information encryption key;

an intermediate key information encrypting portion for encrypting the intermediate key information using key information unique to the recording medium, the key information being generated in accordance with information unique to the recording medium; and a recording portion for recording the encrypted content information and the encrypted intermediate key information to the recording medium.

A seventh aspect of the present invention is a reproducing apparatus, comprising:

at least one of a recording portion for recording encrypted data to a recording medium on which first information for invalidating an illegal electronic device, second information that differs in each content, third information definable for each encrypted unit, and identification data that differs in each stamper are pre-recorded and a reproducing portion for reproducing encrypted data recorded on the recording medium;

a storing portion for storing fourth information unique to a valid electronic device or application software;

a revoking processing portion for determining whether or not the forth information is information unique to a valid electronic device or application software using the first information and the fourth information;

a calculating portion for obtaining intermediate key information unique to each recording medium using the first information, the fourth information, the second information, and the identification data when the determined result of the revoking processing portion represents that the fourth information is information unique to a valid electronic device or application software; and a transmitting portion for transmitting the intermediate key information to the final encryption key generating portion of an information processing apparatus through a transferring portion.

An eighth aspect of the present invention is a data processing apparatus, comprising:

an authenticating portion for authenticating a recording and reproducing apparatus, the recording and reproducing apparatus having fourth information unique to a valid electronic device or application software, for at least recording encrypted data to a recording medium on which first information for invalidating an illegal electronic device, second information that differs in each content, third information definable for each encrypted unit, and identification data that differs in each stamper are pre-recorded or reproducing encrypted data recorded on the recording medium;

a key information decrypting portion for receiving the first information, the fourth information, and intermediate key information from the recording and reproducing apparatus and decrypting the intermediate key information, the first information and the forth information having been encrypted using a session key generated when the authentication has been successfully performed, the intermediate key information being unique to each recording medium and generated using the second information and the identification data;

a final encryption key generating portion for generating a final encryption key using the third information received from the recording and reproducing apparatus and the decrypted intermediate key information; and an encrypting and decrypting portion for at least encrypting data using the final encryption key or decrypting data using the final encryption key.

According to the present invention, the reproducing apparatus side generates a content key. The information processing apparatus side encrypts a content using the content key. Since the reproducing apparatus generates key information with which copyright of a content is protected, the content key can be generated by hardware. As a result, tamper-resistance for secret information is improved. In addition, since the reproducing apparatus generates a random number as an intermediate key, a true random number or a random number close thereto can be generated by hardware for example an LSI in the reproducing apparatus. Thus, it becomes difficult to replace a generated random number with a fixed value. As a result, according to the present invention, it is not necessary for application software installed in the information processing apparatus to have all secret information of a copyright protection technology. Thus, the system according to the present invention is capable of having tamper-resistance for secret information against reverse-engineering for software and securing safety of a copyright protection technology.

According to the present invention, since the recording and reproducing apparatus has a device key as information unique to an electronic device, the recording and reproducing apparatus itself can be revoked. According to the present invention, since random number information necessary for calculating a content key in the information processing apparatus can be generated by for example an LSI in the recording and reproducing apparatus, a true random number or a random number close thereto can be generated in comparison with the case that a random number is generated by software in a PC. Thus, the risk of which a random number is replaced with a fixed value can be suppressed.

DESCRIPTION OF THE PREFERRED EMBODIMENTS

Next, before embodiments of the present invention is described, the relation between terminology used in the claims and terminology used in the embodiments will be described.

Recording medium: medium, for example a disc, reproducing apparatus: drive, information processing apparatus: host, transferring means: drive-host interface, signal processing system: system of which the drive that reproduces data from a medium and the host are connected through the drive-host interface. First transmitting means: means for transmitting information from the drive side to the host side in accordance with a common key encrypting system using a session key as a common key, second transmitting means: means for reversely transmitting information from the host side to the drive side using a session key as a common key.

Content information: information recorded on a medium or information to be recorded. Information unique to a recording medium: medium ID. Random number generating means for generating a random number; random number generator (RNG). Key information unique to a recording medium: medium unique key, intermediate key information: title key. Content information encryption key: content key (content key used to record data is referred to as content information encryption key, content key used to reproduce data is referred to as content information decryption key).

Figure 1:
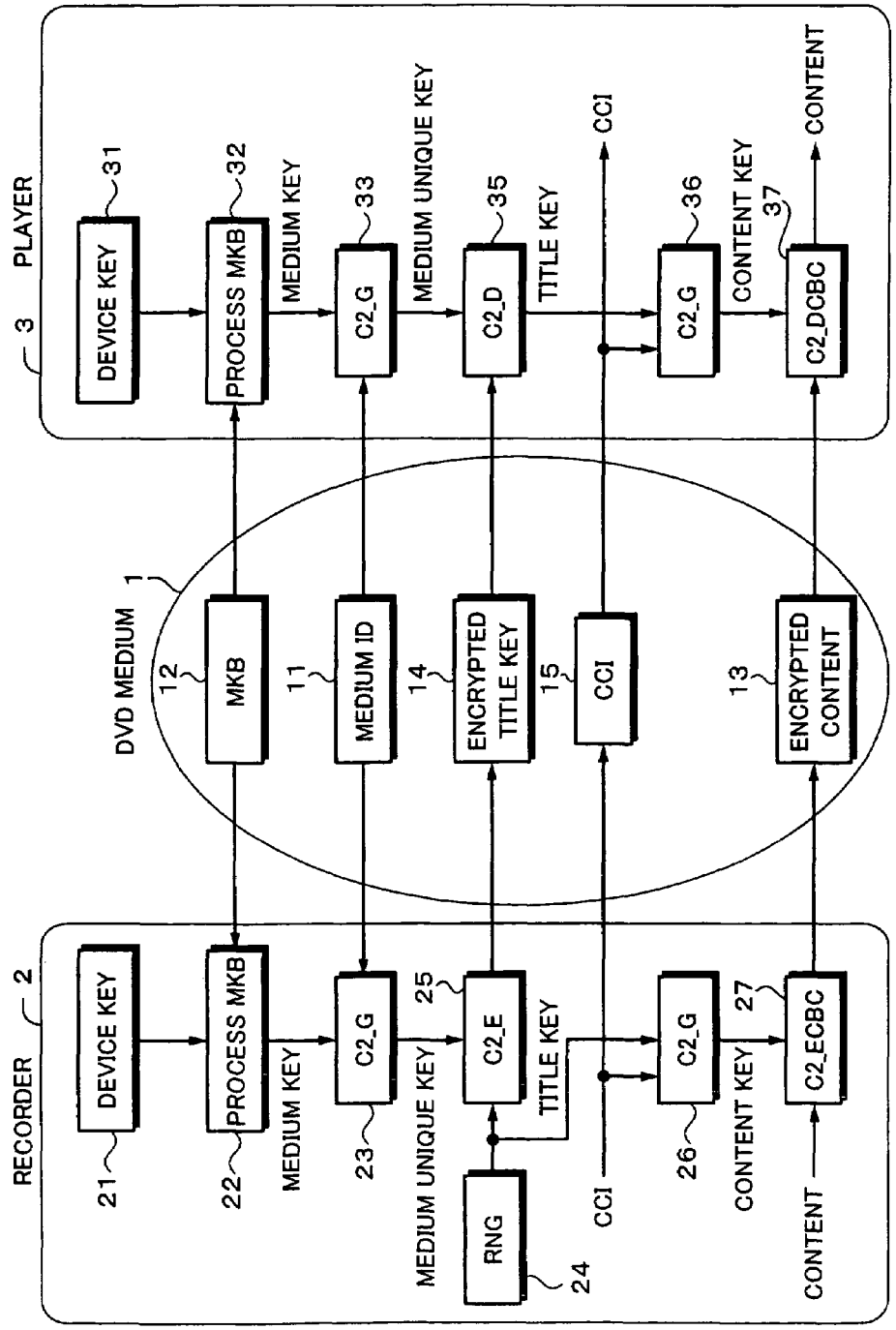
FIG. 1 is a block diagram describing a proposed system composed of a recorder, a player, and a DVD medium.

For easy understanding of the present invention, first of all, with reference to FIG. 1, a copyright protection technology for example an architecture of the CPRM for DVDs will be described. In FIG. 1, reference numeral 1 represents for example a recordable DVD medium such as DVD-R/RW or DVD-RAM based on the CPRM standard. Reference numeral 2 represents for example a recorder based on the CPRM standard. Reference numeral 3 represents for example a player based on the CPRM standard. The recorder 2 and the player 3 are each an apparatus or application software.

In a blank state of the DVD medium 1, in areas called BCA (Burst Cutting Area) or NBCA (Narrow Burst Cutting Area) of a lead-in area on the innermost periphery side of the DVD medium 1, a medium ID 11 is recorded. In an emboss or pre-recorded data zone of the lead-in area, a medium key block (hereinafter sometimes abbreviated as MKB) 12 is pre-recorded. The medium ID 11 is a number that is unique to each medium for example disc. The medium ID 11 is composed of a medium manufacturer code and a serial number. The medium ID 11 is required when a medium key is converted into a medium unique key that is unique to each medium. A medium key block MKB is a bundle of keys to obtain a medium key and revoke the apparatus. The medium ID and medium key block are first information unique to the recording medium.

In a data rewritable or recordable region of the disc 1, an encrypted content 13 that is encrypted with a content key is recorded. As an encrypting system, C2 (Cryptomeria Ciphering) is used.

On the DVD medium 1, an encrypted title key 14 and a CCI (Copy Control Information) 15 are recorded. The encrypted title key 14 is encrypted title key information. The title key information is key information that is added for each title. The CCI is copy control information such as copy no more, copy once, copy free, or the like.

The recorder 2 comprises structural elements that are a device key 21, a process MKB 22, a C2_G 23, a random number generator 24, a C2_E 25, a C2_G 26, and a C2_ECBC 27. The player 3 comprises structural elements that are a device key 31, a process MKB 32, a C2_G 33, a C2_D 35, a C2_G 36, and a C2_DCBC 37. The C2_G 23 and 33 are blocks for calculating medium unique key from the medium ID and the medium key respectively. The C2_G 26 and 36 are blocks for calculating content key from the CCI and the title key respectively.

The device keys 21 and 31 are identification numbers issued for each apparatus maker or each application software vendor. A device key is information unique to a valid electronic apparatus or valid application software assigned by a licenser. The MKB 12 and the device key 21 reproduced from the DVD medium 1 are calculated by the process MKB 22 so as to determine whether or not the electronic apparatus or application software has been revoked. Like the recorder 2, in the player 3, the MKB 12 and the device key 31 are calculated by the process MKB 32 so as to determine whether or not the player 3 has been revoked.

The processes MKB 22 and 32 each calculate a medium key with the MKB 12 and the device keys 21 and 31. When the MKB 12 does not contain a device key of the recorder 2 or the player 3 and the calculated result matches a predetermined value for example 0, it is determined that the recorder 2 or player 3 that has the device key is not valid. In other words, the recorder 2 or player 3 is revoked.

The C2_G 23 and the C2_G 33 are processes each of which calculates a medium key and a medium ID and obtains a medium unique key.

The random number generator (RNG) 24 is used to generate a title key. A title key generated by the random number generator 24 is input to the C2_E 25. The title key is encrypted with a medium unique key. The encrypted title key 14 is recorded on the DVD medium 1.

In the player 3, the encrypted title key 14 and the medium unique key reproduced from the DVD medium 1 are supplied to the C2_D 35. The encrypted title key is decrypted with the medium unique key. As a result, the title key is obtained.

In the recorder 2, the CCI and the title key are supplied to the C2_G 26. The C2_G 26 obtains a content key. The content key is supplied to the C2_ECBC 27. The C2_ECBC 27 encrypts a content with the content key. The encrypted content 13 is recorded on the DVD medium 1.

In the player 3, the CCI and the title key are supplied to the C2_G 36. The C2_G 36 obtains a content key. The content key is supplied to the C2_ECBC 37. The encrypted content 13 reproduced from the DVD medium 1 is decrypted with the content key.

In the structure shown in FIG. 1, a recording process for the recorder 2 will be described. The recorder 2 reads the MKB 12 from the DVD medium 1. The process MKB 22 calculates the device key 21 and the MKB 12 and obtains a medium key. When the calculated result matches a predetermined value, it is determined that the device key 21 (the apparatus or application of the recorder 2) has been revoked by the MKB. At that point, the recorder 2 stops the current process and prohibits a content from being recorded to the DVD medium 1. If the value of the medium key does not match the predetermined value, the recorder 2 continues the current process.

The recorder 2 reads the medium ID 11 from the DVD medium 1 and inputs the medium ID and the medium key to the C2_G 23. The C2_G 23 calculates the medium ID and the medium key and obtains a medium unique key that is unique to each medium. The title key generated by the random number generator 24 is encrypted by the C2_E 25. The encrypted title key 14 is recorded on the DVD medium 1. The title key and the CCI information of the content are calculated by the C2_G 26. As a result, the C2_G 26 obtains a content key. The C2_ECBC 27 encrypts the content with the content key. The encrypted content 13 and the CCI 15 are recorded on the DVD medium 1.

Next, a reproducing process of the player 3 will be described. First of all, the MKB 12 is read from the DVD medium 1. The device key 31 and the MKB 12 are calculated so as to determine whether or not the device key 31 has been revoked. When the device key 31 namely the apparatus or application of the player 3 has not been revoked, a medium unique key is calculated with the medium ID. With the encrypted title key 14 and the medium unique key, a title key is calculated. The title key and the CCI 15 are input to the C2_G 36. As a result, a content key is obtained. The content key is input to the C2_DCBC 37. The C2_DCBC 37 calculates the encrypted content 13 reproduced from the DVD medium 1 with the content key. As a result, the encrypted content 13 is decrypted.

To obtain a content key necessary for decrypting a content, a unique medium ID is required for each DVD medium. Thus, even if an encrypted content on a medium is copied to another medium, since the medium ID of the other medium is different from the medium ID of the original medium, the copied content cannot be decrypted. As a result, the copyright of the content can be protected.

Figure 2:
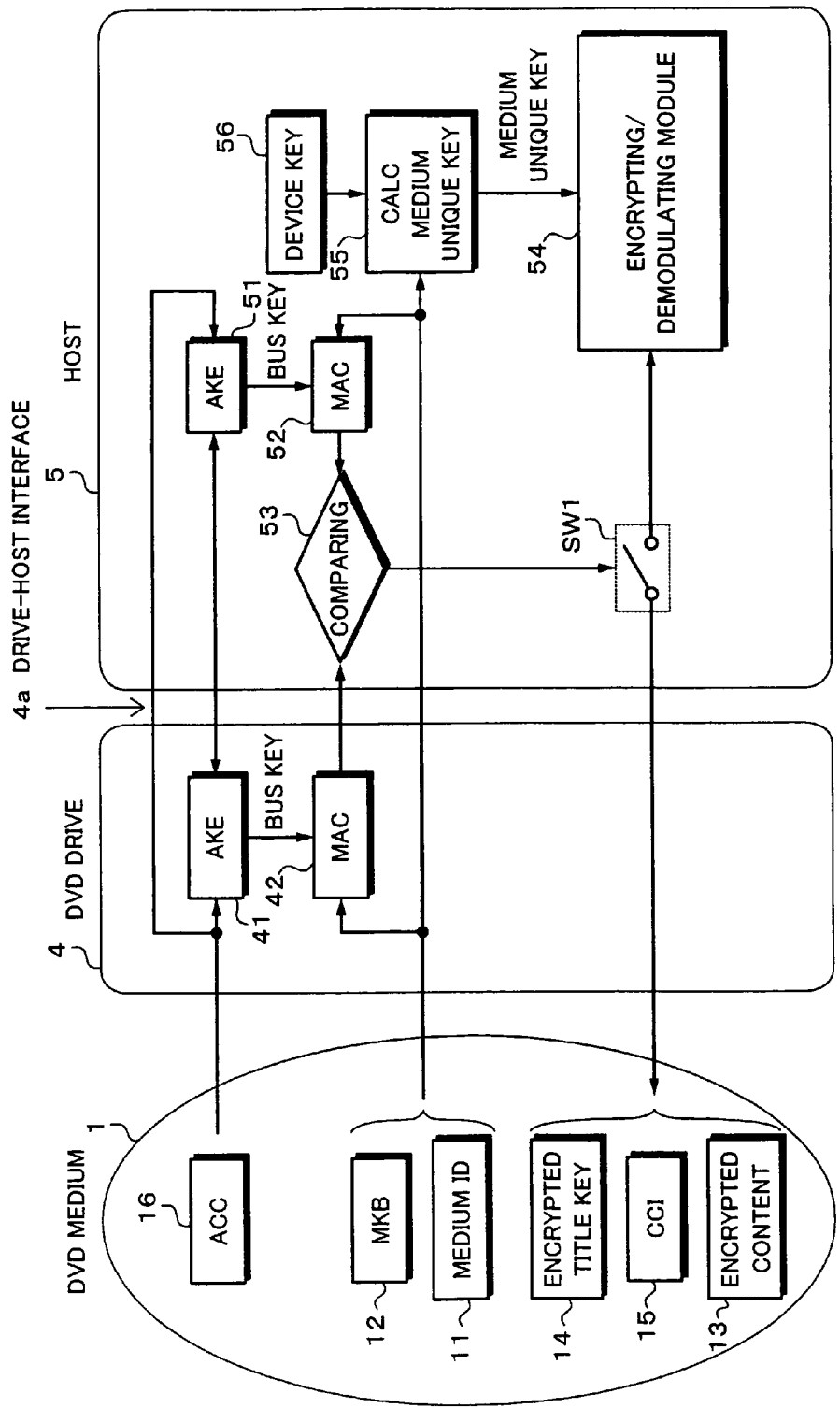
FIG. 2 is a block diagram describing a PC based DVD medium recording and reproducing system.

The structure shown in FIG. 1 is a recording and reproducing apparatus. The present invention is applied to the case that the content protecting process for the DVD medium 1 is performed under a PC environment. Next, with reference to FIG. 2, roles shared by a PC and a drive according to a conventional system will be described. In FIG. 2, reference numeral 4 represents a DVD drive as a recording and reproducing apparatus that records and reproduces a content to and from a DVD medium 1 based on the foregoing CPRM standard will be described.

Reference numeral 5 represents a host for example a PC as a data processing apparatus. The host 5 is an apparatus or application software that can handle a content that can be recorded to the DVD medium 1 and reproduced therefrom and that is connected to the DVD drive 4. The host 5 is composed of for example application software and a PC in which the application software is installed.

The DVD drive 4 and the host 5 are connected with an interface 4a. The interface 4a is for example ATAPI (AT Attachment with Packet Interface), SCSI (Small Computer System Interface), USB (Universal Serial Bus), IEEE (Institute of Electrical and Electronics Engineers) 1394, or the like.

On the DVD medium 1, a medium ID 11, a medium key block 12, and a ACC (Authentication Control Code) are pre-recorded. The ACC is data recorded on the DVD medium 1. The ACC causes the DVD drive 4 and the host 5 to authenticate each other uniquely for each DVD medium 1.

The DVD drive 4 reads an ACC 16 from the DVD medium 1. The ACC 16 that is read from the DVD medium 1 is input to an AKE (Authentication and Key Exchange) 41 of the DVD drive 4. In addition, the ACC 16 is transferred to the host 5. The host 5 inputs the received ACC to an AKE 51. The AKEs 41 and 51 exchange random number data and generates a common session key (referred to as bus key in the structure shown in FIG. 2) that varies in each authenticating operation with the exchanged random numbers and the value of the ACC.

The bus key is supplied to MAC (Message Authentication Code) calculating blocks 42 and 52. The MAC calculating blocks 42 and 52 are processes that calculate a medium ID and a MAC of the medium key block 12 with the obtained bus keys as parameters obtained by the AKEs 41 and 51. The host 5 uses the MAC calculating blocks 42 and 52 so as to determine whether or not the MKB and medium ID have integrity.

A comparing portion 53 of the host 5 compares the MACs calculated by the MACs 42 and 52 and determines whether or not they match. When the values of the MACs match, it is confirmed that the MKB and the medium ID have integrity. A switch SW1 is controlled in accordance with the compared output.

The switch SW1 turns on/off a signal path between a recording path or a reproducing path of the DVD medium 1 of the DVD drive 4 and an encrypting/(or) decrypting module 54 of the host 5. The switch SW1 represents on/off of the signal path. Actually, the switch SW1 represents that when the signal path is turned on, the process of the host 5 is continued and that when the signal path is turned off, the process of the host 5 is stopped. The encrypting/decrypting module 54 is a calculating block that calculates a content key with a medium unique key, an encrypted title key, and a CCI, encrypts a content with the content key, obtains an encrypted content 13 or decrypts the encrypted content 13 with the content key.

A medium unique key calculating block 55 is a calculating block that calculates a medium unique key with the MKB 12, the medium ID, and a device key 56. Like the recorder or player shown in FIG. 1, the medium unique key calculating block 55 calculates a medium key with the device key and the MKB 12. The medium unique key calculating block 55 calculates a medium unique key with the medium key and the medium IC 11. When the medium key is a predetermined value, it is determined that the electronic apparatus or application software is not valid. As a result, the electronic apparatus or application software is revoked. Thus, the medium unique key calculating block 55 also functions as a revoke processing portion that revokes the electronic apparatus or application software.

When a content is recorded, if the result of the comparing portion 53 has confirmed integrity, the switch SW1 is turned on. At that point, the encrypted content 13, the encrypted title key 14, and the CCI 15 are supplied from the encrypting/decrypting module 54 to the DVD drive 4 through the switch SW1. As a result, the encrypted content 13, the encrypted title key 14, and the CCI 15 are recorded to the DVD medium 1. When a content is reproduced, if the result of the comparing portion 53 has confirmed integrity, the SW1 is turned on. At that point, the encrypted content 13, the encrypted title key 14, and the CCI 15 reproduced from the DVD medium 1 are supplied to the encrypting/decrypting module 54 through the switch SW1. The encrypting/decrypting module 54 decrypts the encrypted content.

Figure 3:
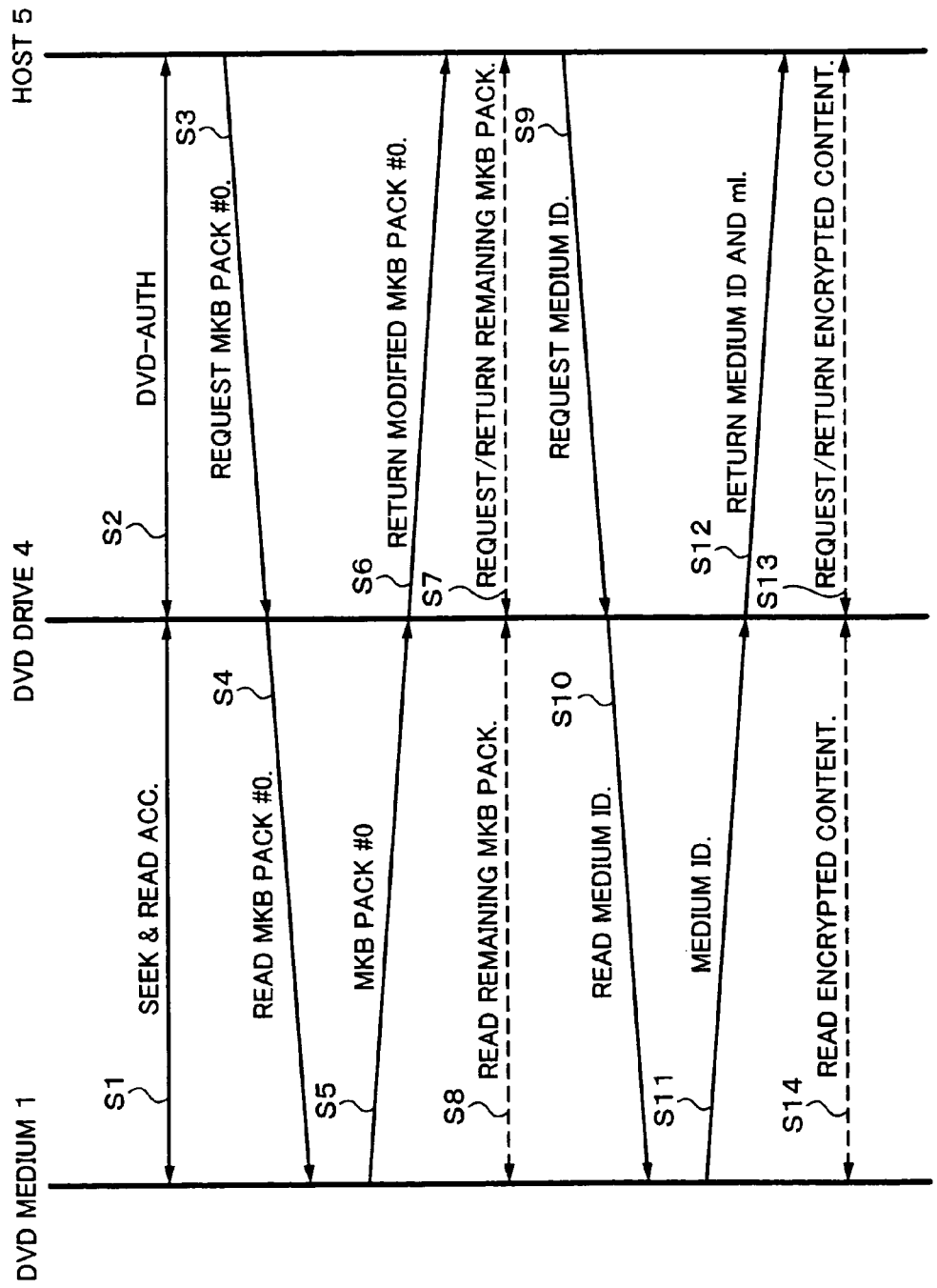
FIG. 3 is a schematic diagram describing steps of processes of a DVD drive 4 and a host 5 of the system shown in FIG. 2.

FIG. 3 shows steps of a process for exchanging signals among the DVD medium 1, the DVD drive 4, and the host 5 in the system using the DVD medium under the conventional PC environment shown in FIG. 2. The host 5 sends a command to the DVD drive 4. The DVD drive 4 performs an operation in accordance with the command.

In response to the command received from the host 5, the ACC of the DVD medium 1 is sought and read (at step S1). At the next step S2, the ACC is input to the AKE 41. In addition, the ACC is transferred to the host 5. In the host 5, the received ACC is input to the AKE 51. The AKEs 41 and 51 exchange random number data. The AKEs 41 and 51 generate a bus key as a session key that varies in each session with the exchanged random numbers and the value of the ACC 16. The bus key is shared by the DVD drive 4 and the host 5. When a mutual authentication has not been successful, the process is stopped.

Whenever the disc is detected or the disc is changed after the power is turned on, an authenticating operation is performed. When a recording operation is performed with the recording button or a reproducing operation is performed with the play button, an authenticating operation may be performed. For example, when the record button or play button is pressed, an authenticating operation is performed.

When authentication has been successful, at step S3, the host 5 requests the DVD drive 4 to read a MKB (medium key block) pack #0 from the DVD medium 1. MKB pack 0 to pack 15 of 16 sectors are recorded repeatedly 12 times in the lead-in area. The error correction code encoding process is performed in the unit of one pack.

At step S4, the DVD drive 4 reads the MKB pack #0. At step S5, the pack #0 is read. The DVD drive 4 returns a modified MKB to the host 5 (at step S6). When the DVD drive 4 reads an MKB, the DVD drive 4 calculates a MAC value with a bus key as a parameter, adds the MAC value to the MKB, and transfers the resultant data to the host 5. At steps S7 and S8, the requesting operation, the reading operation, and the transferring operation are repeatedly performed for the remaining MKB packs other than the pack #0 namely until for example the pack #15 is read and transferred to the host 5.

The host 5 requests a medium ID of the DVD drive 4. The DVD drive 4 reads the medium ID from the DVD medium 1. At step S11, the medium ID is read. When the DVD drive 4 reads the medium ID from the DVD medium 1, the DVD drive 4 calculates the MAC value with the bus key as a parameter. At step S12, the DVD drive 4 adds a MAC value m1 to the medium ID and transfers the resultant data to the host 5.

The host 5 calculates the MAC value with parameters of the MKB 12 received from the DVD drive 4 and the bus key received from the medium ID 11. The comparing portion 53 compares the calculated MAC value with the MAC value received from the DVD drive 4. When they match, the host 5 determines that the received MKB and medium ID are valid and turns on the switch SW1 so as to cause the process to advance. In contrast, when they do not match, the host 5 determines that the received MKB and medium ID have been revoked and turns off the switch SW1 so as to cause the process to stop.

At step S13, the host 5 requests an encrypted content of the DVD drive 4. At step S14, the DVD drive 4 reads the encrypted content from the DVD drive 4. At step S13, the encrypted content is transferred to the host 5. The medium unique key calculating block 55 of the host 5 calculates a medium unique key with the device key 56, the MKB 12, and the medium ID 11. The medium unique key is supplied to the encrypting/decrypting module 54. The encrypting/decrypting module 54 obtains a content key with the encrypted title key 14 and the CCI 15. The encrypting/decrypting module 54 decrypts the encrypted content that is read from the DVD medium 1 with the content key. The encrypting/decrypting module 54 encrypts a content that is recorded to the DVD medium 1.

Figure 4:
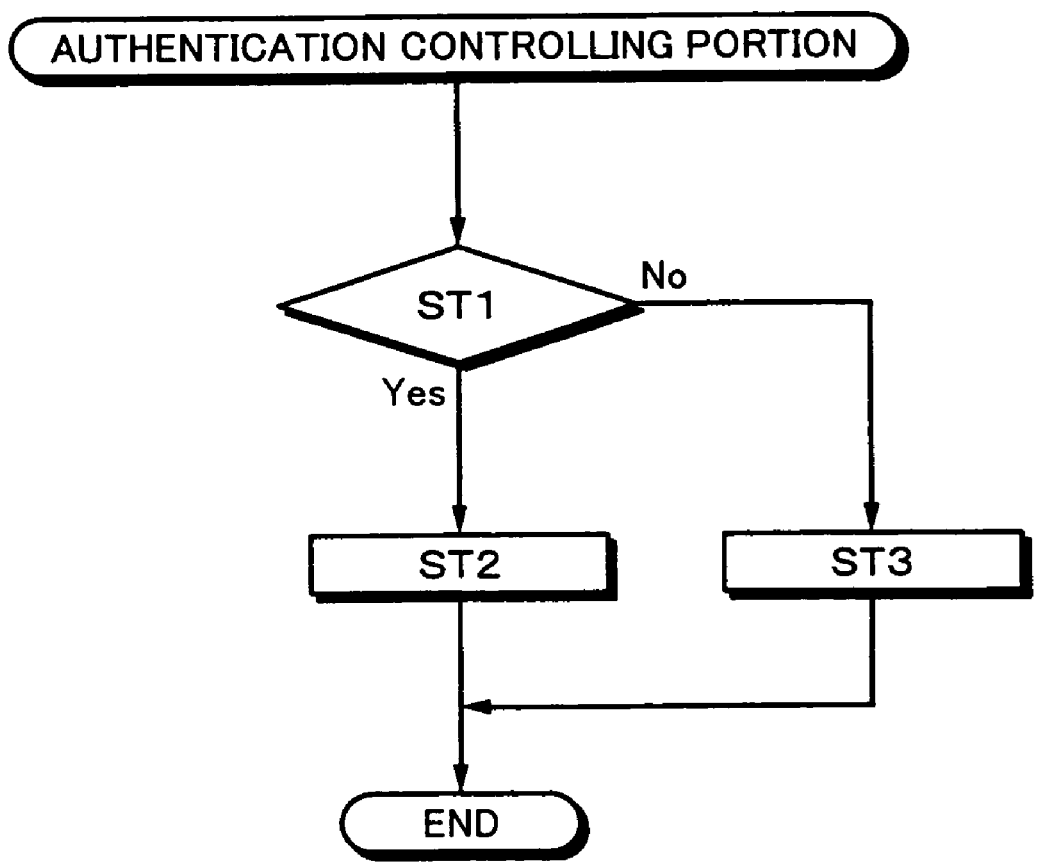
FIG. 4 is a flow chart describing an authenticating operation of the system shown in FIG. 2.

At step ST1 of a flow chart shown in FIG. 4, a MAC calculated value obtained with a bus key as a parameter by the MAC calculating block 42 is compared with a MAC calculated value obtained with a bus key as a parameter by the comparing portion 53. When they match, at step ST2, the switch SW1 is turned on. When they do not match, at step ST3, the switch SW1 is turned off and the process is stopped.

The foregoing CPRM uses the same bus key generating method as the CSS, which is a copyright protection technology for the DVD-Video. Although the contents of the CSS authenticating system is supposed to be secret, it has been analyzed and can be operated by free software that has not been permitted by DVD-CCA, which is a CSS license management organization. In addition, a content protecting process is performed on the host side. In other words, all a revocation determining process, a medium key obtaining process, a medium unique key obtaining process, a title key generating process, a title key obtaining processes, a content key obtaining process, a content encrypting process, and a content decrypting process are performed on the host side. Thus, the reliability of the copyright protection technology deteriorates.

An embodiment of the present invention is to solve such a problem. According to the embodiment, a structure for obtaining a title key in a content protecting process in a PC environment is disposed in a drive. After the drive and the PC mutually authenticates each other, the title key and the content key are transmitted to the PC.

Figure 5:
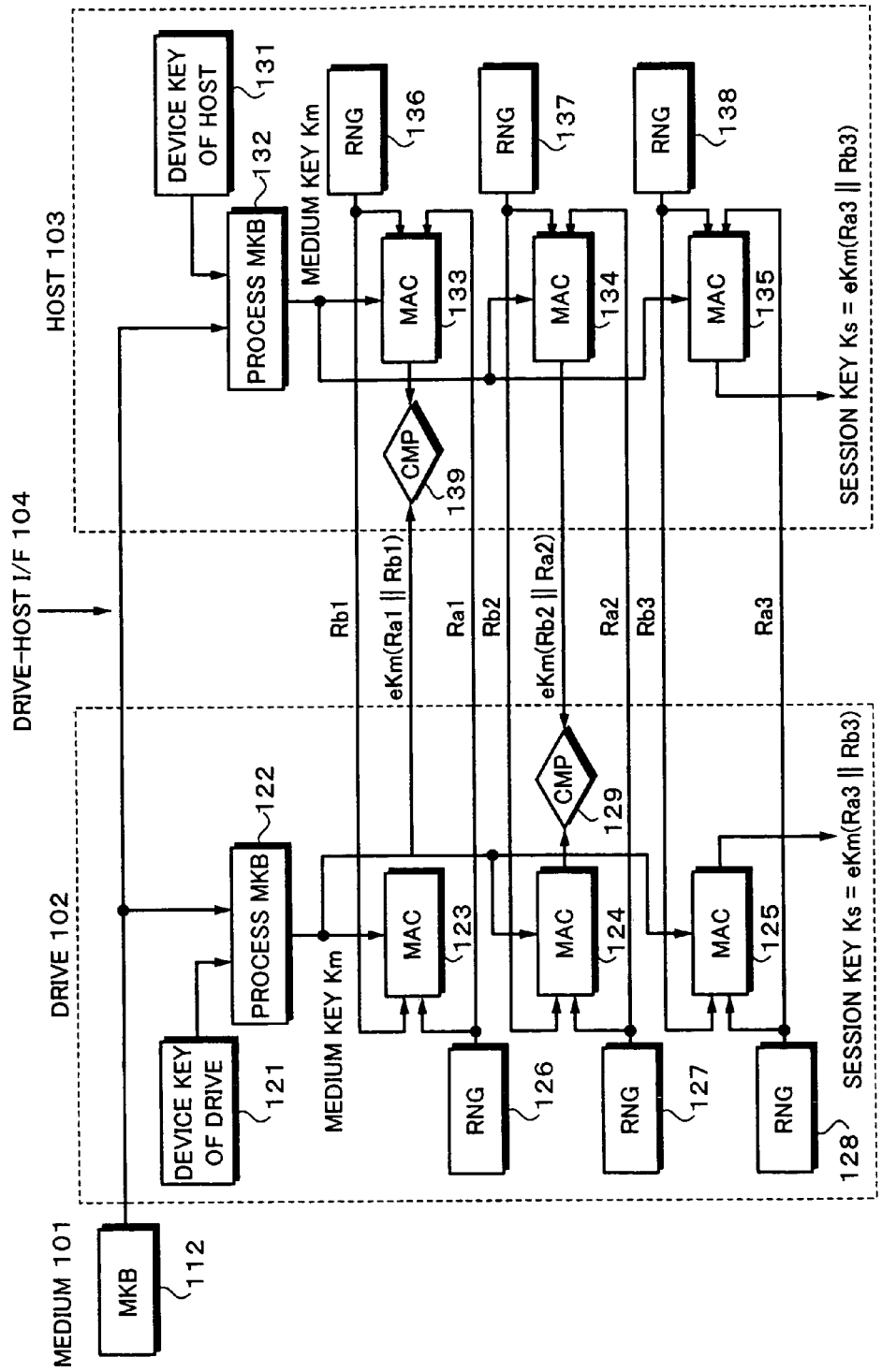
FIG. 5 is a block diagram showing a structure for performing mutual authentication according to an embodiment of the present invention.
Figure 6:
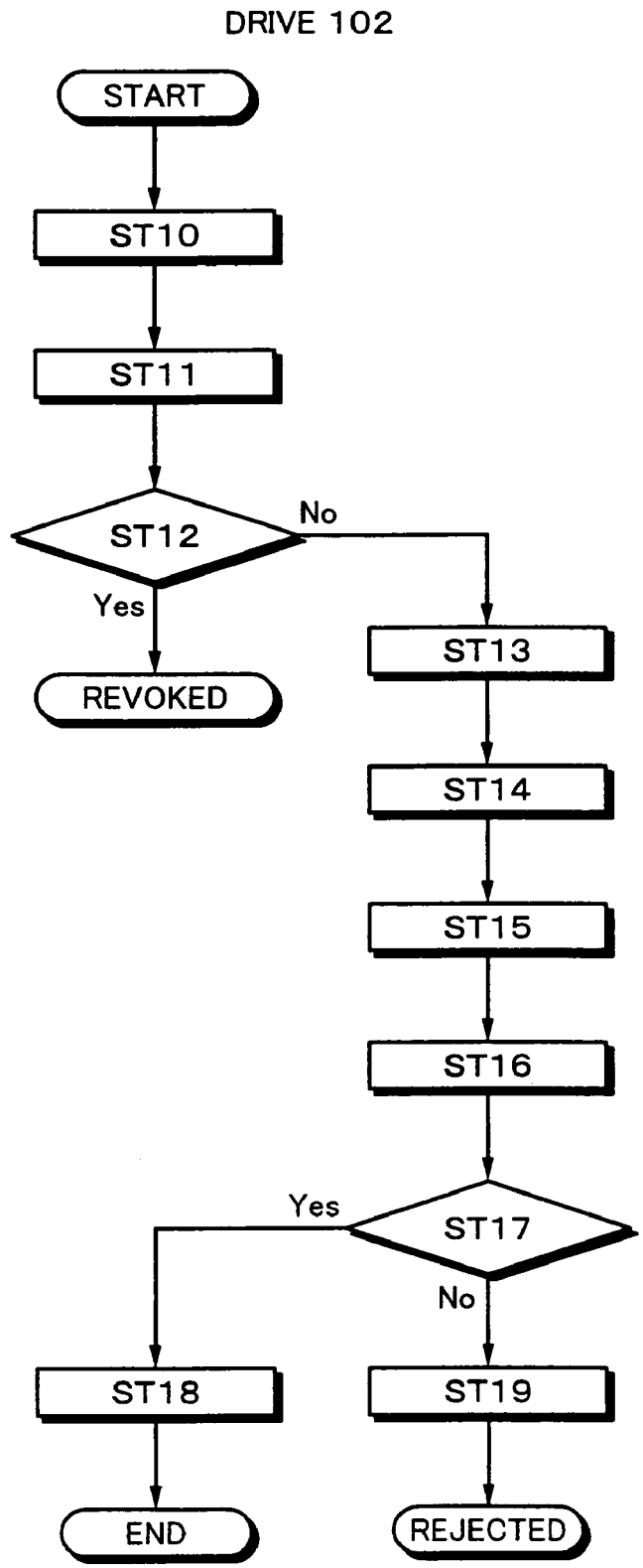
FIG. 6 is a flow chart describing steps of a process of an authenticating operation of the drive according to the embodiment of the present invention.
Figure 7:
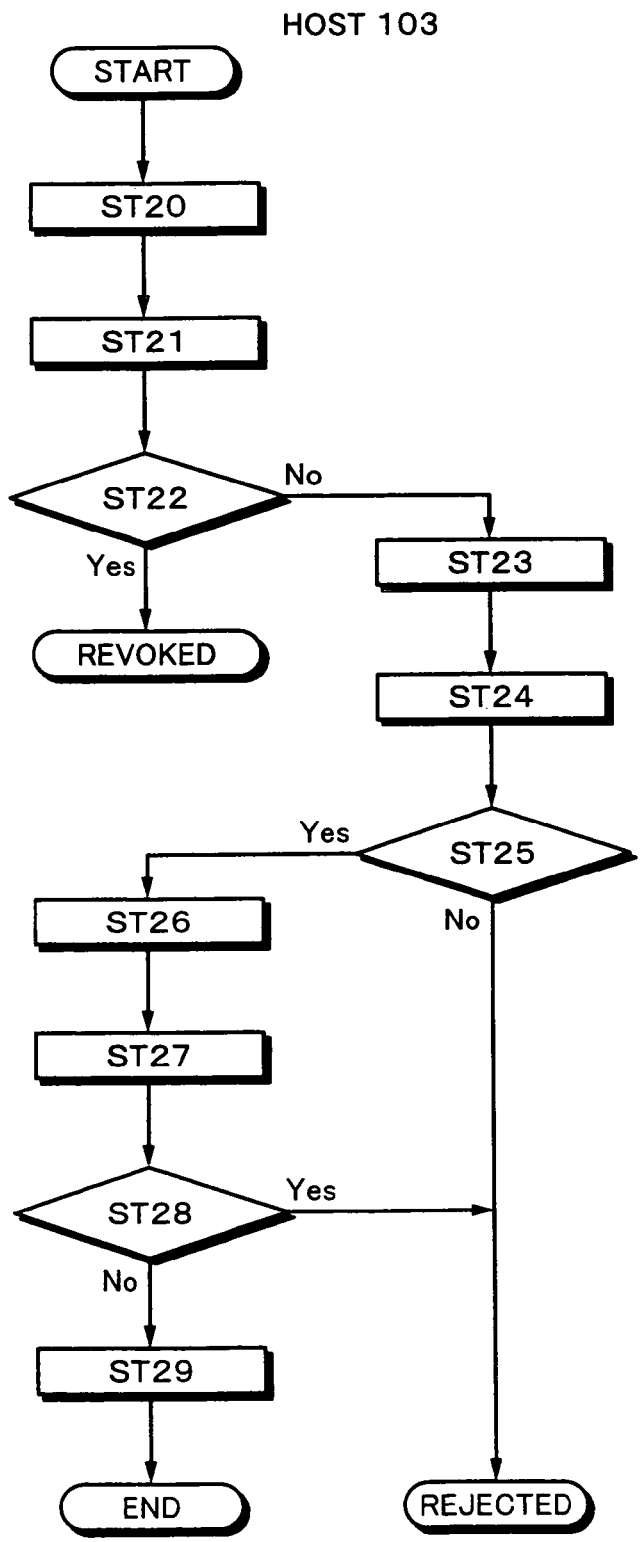
FIG. 7 is a flow chart describing steps of a process of an authenticating operation of the host according to the embodiment of the present invention.

FIG. 5 is a block diagram showing a structure for performing the mutual authentication according to the embodiment. FIG. 6 is a flow chart showing a process on the drive side. FIG. 7 is a flow chart showing a process on the host side. In the following description, reference numeral 101 represents a medium for example an optical disc. Reference numeral 102 represents a drive for a medium. Reference numeral 103 represents a host connected to the drive 102 through a drive-host interface 104. On the medium 101, information similar to that of the foregoing DVD medium is pre-recorded. The medium 101 may be not only a recordable type, but a read-only type. The host 103 sends a predetermined command to the drive 102 so as to control the operation of the drive 102. Commands that are used are commands described in the foregoing non-patent related art reference 2, extended commands, a READ command for reading a content from the medium 101 as sector data, and a WRITE command for writing a content as sector data to the medium 101.

The drive 102 has a device key 121 for the drive. The host 103 has a device key 131 for the host. The device key 121 is mainly placed in an LSI (Large Scale Integrated Circuit) and securely stored so that it cannot be read from the outside of the drive 102. The device key 131 may be securely stored in a software program or stored as hardware. To allow the drive 102 to be a valid drive that can handle the medium 101, the drive 102 requires secret information of the copyright protection technology such as a device key according to the embodiment. Thus, a clone drive that pretends to be an authorized drive without a proper license can be prevented from being produced.

As shown in FIG. 5, the drive 102 has a process MKB 122 that inputs an MKB and the device key 121 and determines whether or not the device key of the drive has been revoked. Likewise, the host 103 has a process MKB 132. When the drive has not been revoked, a medium key Km is output from each of the process MKBs 122 and 132. After the revoke determining process has been performed and the medium key Km has been obtained an authenticating process is performed.

Reference numerals 123, 124, and 125 represent MAC calculating blocks that calculate a MAC value using the medium key Km as a parameter. Reference numerals 126, 127, and 128 represent random number generators (RNGs). The random number generator 126 generates a random number Ra1. The random number generator 127 generates a random number Ra2. The random number generator 128 generates a random number Ra3. The random number generators 126, 127, and 128 are random number generators composed of for example an LSI. Thus, they can generate random numbers close to true random numbers in comparison with a method of which random numbers are generated by software. Although the random number generators may be composed of common hardware, random numbers Ra1, Ra2, and Ra3 are independent.

The host 103 has MAC calculating blocks 133, 134, and 135 and random number generators 136, 137, an 138. The MAC calculating blocks 133, 134, and 135 calculate MAC values using the medium key Km as a parameter. The random number generator 136 generates a random number Rb1. The random number generator 137 generates a random number Rb2. The random number generator 138 generates a random number Rb3. The random number generators 136, 137, and 138 are normally software that generates random numbers. Alternatively, the random number generators 136, 137, and 138 may be hardware that generate random numbers.

The random numbers generated in the drive 102 are exchanged with the random numbers generated in the host 103. In other words, the random number Ra1 and the random number Rb1 are input to each of the MAC calculating blocks 123 and 133. The random number Ra2 and the random number Rb2 are input to each of the MAC calculating blocks 124 and 134. The random number Ra3 and the random number Rb3 are input to each of the MAC calculating blocks 125 and 135.

The MAC value calculated by the MAC calculating block 123 of the drive 102 and the MAC value calculated by the MAC calculating block 133 of the host 103 are compared by a comparing portion 139 of the host 103. The comparing portion 139 determines whether or not the two values are the same. In this example, the MAC value is denoted by eKm (Ra1 | | Rb1). eKm () represents that data in parentheses is encrypted using the medium key Km as a key. The symbol Ra1 | | Rb1 represents that two random numbers are combined so that the random number Ra1 is placed on the left side and the random number Rb1 is placed on the right side. When the compared result represents that the two values are the same, the host 103 has successfully authenticated the drive 102. Otherwise, the host 103 has not successfully authenticated the drive 102.

The MAC value calculated by the MAC calculating block 134 of the host 103 and the MAC value calculated by the MAC calculating block 124 of the drive 102 are compared by a comparing portion 129 of the drive 102. The comparing portion 129 determines whether or not the two values are the same. The MAC value is denoted by eKm(Rb2 | | Ra2). When the compared result represents that the two values are the same, the drive 102 has successfully authenticated the host 103. Otherwise, the drive 102 has not successfully authenticated the host 103.

When the comparing portions 139 and 129 have determined that the MAC values are the same and it has been confirmed that the drive 102 and the host 103 are valid, namely mutual authentication has been successfully performed, the MAC calculating blocks 125 and 135 generate a common session key eKm(Ra3 | | Rb3).

Next, with reference to flow charts shown in FIG. 6 and FIG. 7, a process of the mutual authentication will be described. First of all, at step ST20 shown in FIG. 7, the host 103 issues a command REPORT KEY and requests the drive 102 for the MKB. At step ST10 shown in FIG. 6, the drive 102 reads the MKB 112 from the medium 101 and transfers the MKB 112 to the host 103.

Thereafter, at step ST11, the drive 102 causes the process MKB 122 to calculate the medium key Km. At step ST21, the host 103 causes the process MKB 132 to calculate the medium key Km. In the calculating process, the drive 102 and the host 103 determine whether or not the device keys 121 and 31 represent that the drive 102 and the host 103 should be revoked (at step ST12 shown in FIG. 6 and step ST22 shown in FIG. 7).

When the drive 102 and the host 103 should be revoked, they are revoked and the process is completed. When the host 103 should not be revoked, at step ST23, the host 103 transfers the random number Rb1 and the random number Rb2 generated by the random number generators 136 and 137 to the drive 102 using a command SEND KEY. When the drive 102 should not be revoked, at step ST13, the drive 102 receives the random numbers transferred from the host 103.

Thereafter, the host 103 requests the drive 102 to transfer a response value of the MAC using the medium key Km of the drive 102 and the random number Ra1 generated by the random number generator 126 to the host 103 using a command REPORT KEY (at step ST24). This response value is denoted by eKm(Ra1 | | Rb1). eKm ( ) represents that data in parentheses is encrypted using the medium key Km as an encryption key. The symbol Ra1 | | Rb1 represents that two random numbers are combined so that the random number Ra1 is placed on the left side and the random number Rb1 is placed on the right side.

After the drive 102 has received the command REPORT KEY from the host 103, at step ST14, the drive 102 transfers the MAC value eKm(Ra1 | | Rb1) and the random number Ra1 generated by the MAC calculating block 123 to the host 103. At step ST25, the host 103 causes the MAC calculating block 133 to calculate the MAC value and cause the comparing portion 139 to determine whether the calculated MAC value matches the MAC value received from the drive 102. When the received MAC value matches the calculated MAC value, the host 103 has successfully authenticated the drive 102. When the compared result at step ST25 represents that the MAC values do not match, the host 103 has not successfully authenticated the drive 102. As a result, a rejecting process is preformed.

When the host 103 has successfully authenticated the drive 102, at step ST26, the host 103 sends the command REPORT KEY to the drive 102 so as to request the drive 102 to transfer the random number Ra2 and the random number Ra3 generated by the random number generators 124 and 125 of the drive 102 to the host 103. In response to the command, at step ST15, the drive 102 transfers these random numbers to the host 103.

At step S27, the MAC calculating block 134 of the host 103 calculates a response value eKm(Rb2 | | Ra2) of MAC using the random number received from the drive 102 and the medium key Km of the host 103 and transfers the response value eKm(Rb2 | | Ra2) and the random number Rb3 to the drive 102 using the command SEND KEY.

At step ST16, when the drive 102 has received the response value eKm(Rb2 | | Ra2) and the random number Rb3 from the host 103, the drive 102 calculates the MAC value by itself. At step ST17, the drive 102 causes the comparing portion 129 to determine whether or not the calculated MAC value matches the MAC value received from the host 103. When the received MAC value matches the calculated MAC value, the drive 102 has successfully authenticated the host 103. In this case, at step ST18, the MAC calculating block 125 generates the session key eKm(Rb3 | | Ra3) and transmits information that represents that the host 103 has been successfully authenticated to the host 103. Thereafter, the authenticating process is completed. The session key is varied whenever the authenticating process is performed.

When the compared result at step ST17 represents that the MAC values do not match, the drive 102 has not successfully authenticated the host 103. At step ST19, error information that represents that the host 103 has not been successfully authenticated is transmitted to the host 103.

In response to the command SEND KEY, the host 103 receives information that represents whether or not the host 103 has been successfully authenticated from the drive 102. At step ST28, in accordance with the received information, the host 103 determines whether or not the authenticating process has been completed. When the host 103 has received the information that represents that the authentication has been successful, the host 103 determines that the authenticating process has been completed. When the host 103 has received information that represents that the authentication has not been successful, the host 103 determines that the authenticating process has not been completed. When the authenticating process has been completed, at step ST29, the MAC calculating block 135 generates a session key eKm(Ra3 | | Rb3) (of for example 64 bits) that is in common with the drive side. When the authenticating process has not been completed, a rejecting process is performed. In the following description, the session key eKm(Ra3 | | Rb3) is denoted by Ks.

In the mutual authentication according to the foregoing embodiment, the drive 102 is capable of having a revoking function. Thus, the drive 102 does not need a special authenticating key dedicated for authentication is not require.

In addition, the drive 102 causes the comparing portion 129 to check the authentication result of the host 103. Thus, the drive 102 is capable of determining whether or not it has been mounted after it had been correctly licensed by the host 103.

Next, with reference to FIG. 8, a structure of a recorder that incorporates a drive 102 and a host 103 that perform the foregoing mutual authentication according to an embodiment will be described. The recorder according to the embodiment securely transfers a medium unique key calculated by the drive 102 to the host 103 using a session key Ks generated by mutual authentication. A random number generator 143 of the drive 102 generates a title key. The drive 102 generates a content key using a title key and a CCI 232. The generated content key is securely transferred to the host 103 using a session key Ks. The host 103 encrypts a content using a decrypted content key and transfers the encrypted content to the drive 102. The drive 102 records the encrypted content, the encrypted title key, and the CCI 232 to the medium 101. A CCI recorded on the medium 101 is denoted by reference numeral 115. In other words, the drive 102 generates the medium unique key and the content key.

The drive 102 that composes the recorder has structural elements of a device key 121, a process MKB 122, a C2_G2 141, a DES (Data Encryption Standard) encryptor 142, a random number generator 143, a C2_G 145, and a DES encryptor 146. The C2_G2 141 is a block that calculates a medium unique key using the medium ID and the medium key. The G2_G2 145 is a block that calculates the content key using the title key and the CCI 232.

The process MKB 122 calculates an MKB 112 reproduced from the medium 101 and the device key 121. As a result, it is determined whether or not the drive 102 has been revoked. The process MKB 122 calculates the medium key using the MKB 112 and the device key 121. When the MKB 112 does not contain the device key 121 of the drive 102 and the calculated result matches a predetermined value for example zero, it is determined that the drive 102 that has the device key 121 is not valid. Thus, the drive 102 is revoked.

The C2_G 141 is a process for calculating the medium key and a medium ID 111 and obtaining a medium unique key as a calculated result. The DES encryptor 142 encrypts the medium unique key using a session key Ks. In this example, as an encrypting system, DES CBC mode is used. An output of the DES encryptor 142 is transmitted to a DES decryptor 151 of the host 103.

The random number generator 143 of the drive 102 generates a title key. The title key generated by the random number generator 143 is supplied to a C2_E 153 of the host 103. The C2 encrypts the title key using a medium unique key. The encrypted title key denoted by reference numeral 114 is recorded to the medium 101.

The host 103 causes a MAC calculating block 158 to calculate a MAC value eKs(CCI) of a CCI using the session key Ks. The MAC value eKs(CCI) and a CCI 232 are transferred to the drive 102.

The drive 102 causes an MAC calculating block 157 to calculate a MAC value eKs(CCI) using the CCI 232 received from the host 103 and the session key Ks. The calculated MAC value eKs (CCI) and the MAC value received from the host 103 are supplied to a comparing portion 159.

When both the MAC values match, the comparing portion 159 determines that the CCI 232 received from the host 103 has not been tampered. As a result, the drive 102 turns on a switch SW2. In contrast, when the MAC values do not match, the comparing portion 159 determines that the CCI has been tampered. At that point, the drive 102 turns off the switch SW2 and stops the process.

In the drive 102, the CCI 232 received from the host 103 and the title key are supplied to the C2_G 145. The C2_G 145 obtains a content key. The content key is supplied to a DES encryptor 146. The DES encryptor 146 encrypts the content key using the session key Ks. The encrypted content key is transferred to a DES decryptor 156 of the host 103.

The content key decrypted by the DES decryptor 156 of the host 103 using the session key Ks is supplied to a C2_ECBC 155. The C2_ECBC 155 encrypts the content using the content key. The encrypted content denoted by reference numeral 113 is transferred to the drive 102. The drive 102 records the encrypted content 113 to the medium 101.

Figure 9:
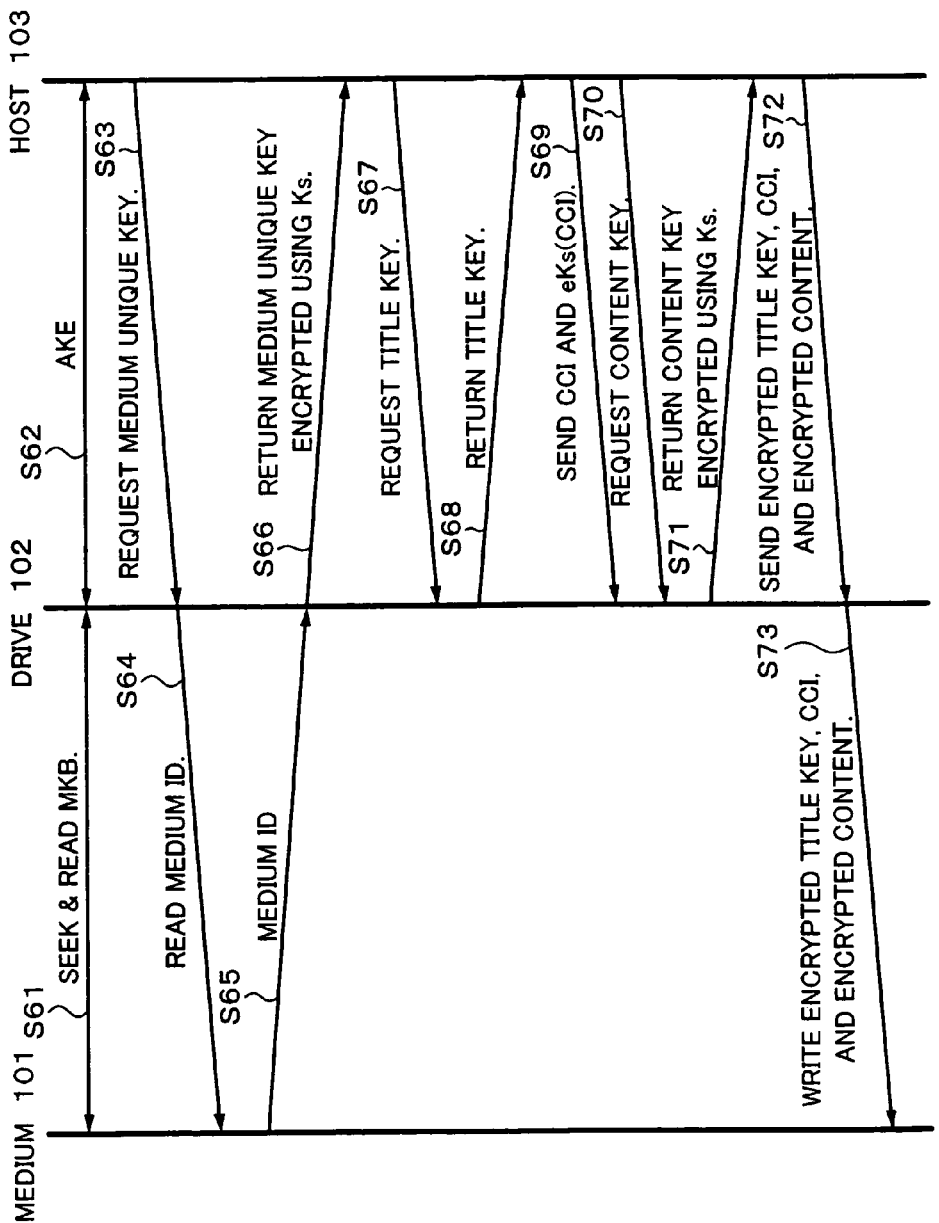
FIG. 9 is a schematic diagram describing an example of steps of a communicating procedure of the recorder.

FIG. 9 shows steps of a content recording procedure of the recorder according to the embodiment. First of all, the drive 102 seeks an MKB from the medium 101 and reads the MKB therefrom in accordance with a request from the host 103 (at step S61). At step S62, AKE (Authentication and Key Exchange) is performed. In other words, the foregoing revoking process and mutual authenticating operation of the drive 102 and the host 103 are performed.

The mutual authenticating operation is always performed whenever the power of the recorder is turned on and a disc is detected or whenever the current disc is replaced with another disc. Alternatively, when the record button is pressed for the recording operation or the play button is pressed for the reproducing operation, the authenticating operation may be performed. For example, when the record button or the play button is pressed, the authenticating operation is performed.

When the mutual authentication has not been successfully performed, the rejecting process is performed and the subsequent process of the recorder is stopped. When the mutual authentication has been successfully preformed, both the drive 102 and the host 103 generate a session key Ks and share it.

At step S63, the host 103 requests the drive 102 for a medium unique key. The drive 102 seeks a medium ID of the medium 101 (at step S64) and reads a medium ID from the medium 101 (at step S65). The drive 102 calculates the medium key and the medium ID so as to generate a medium unique key. At step S66, the medium unique key is encrypted with the session key Ks. The encrypted medium unique key is transferred to the host 103.

Next, at step S67, the host 103 requests the drive 102 for a title key. At step S68, the drive 102 transfers the title key to the host 103. The host 103 decrypts the encrypted medium unique key using the session key Ks. The host 103 encrypts the title key using the medium unique key and generates an encrypted title key.

At step S69, the host 103 sends a CCI 232 to the drive 102. At that point, to prevent the CCI 232 from being tampered, the host 103 transfers a MAC value eKs(CCI) calculated as authentication data of the CCI 232 to the drive 102. After it has been determined that the CCI 232 had not been tampered, the drive 102 generates a content key using the title key and the CCI 232 and encrypts the content key using the session key Ks. At step S70, the host 103 requests the drive 102 for the content key. At step S71, the drive 102 sends the encrypted content key to the host 103.

The host 103 decrypts the encrypted content key using the session key Ks and obtains the content key. The host 103 encrypts a content using the content key. At step S72, the host 103 transfers the encrypted title key, the encrypted content, and the CCI 232 to the drive 102. At step S73, the drive 102 records the encrypted title key, the encrypted content, and the CI 232 to the medium 101.

Figure 8:
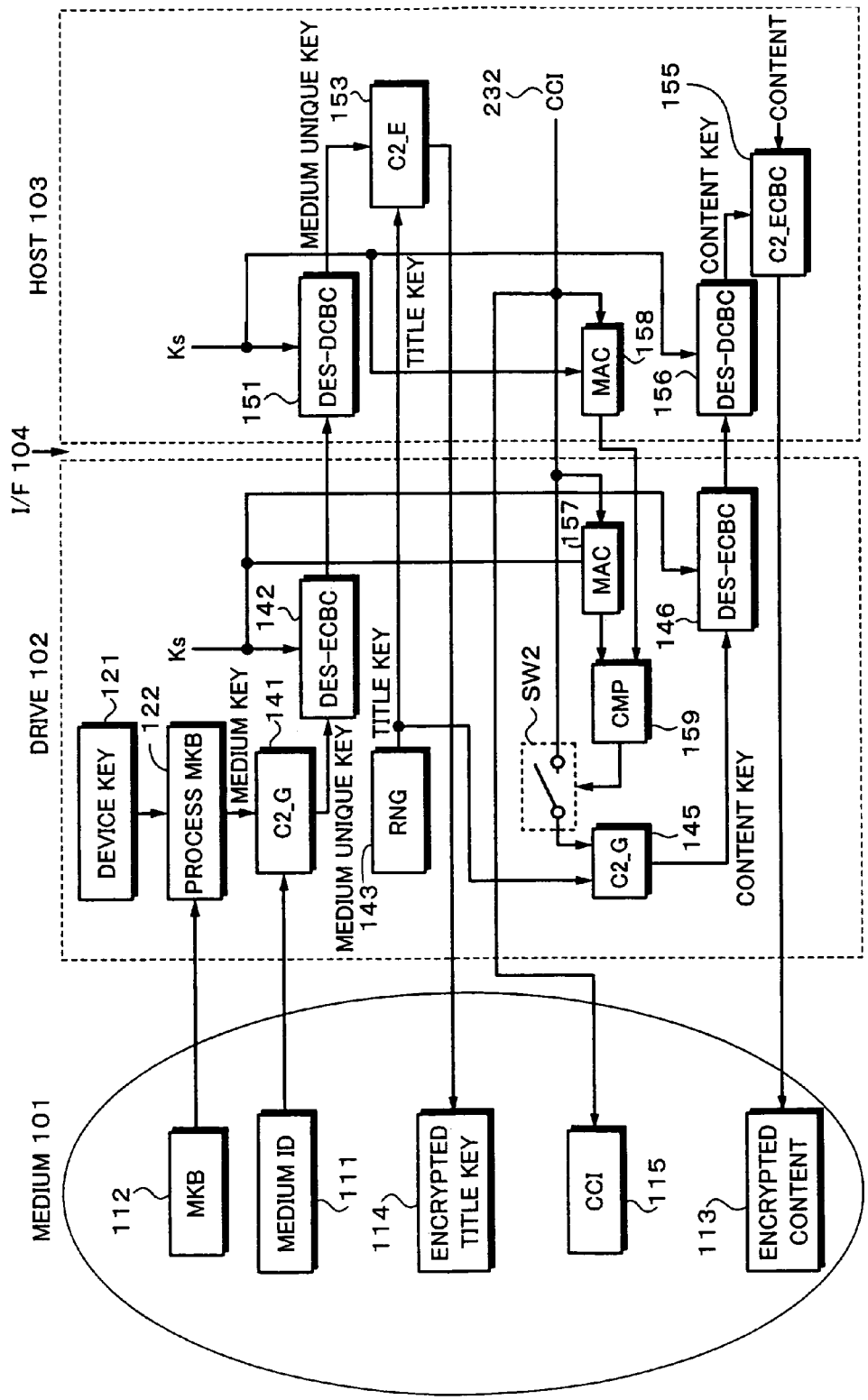
FIG. 8 is a block diagram showing an example of a structure of a recorder that integrates the drive and the host according to the embodiment of the present invention.

In the recorder having the structure shown in FIG. 8, a true random number or a random number close thereto is generated by hardware for example an LSI of the drive 102. As a result, it becomes difficult to replace a generated random number with a fixed value. In addition, in the drive 102, a content key is generated by hardware. Thus, copyright protection can be securely implemented.

Figure 10:
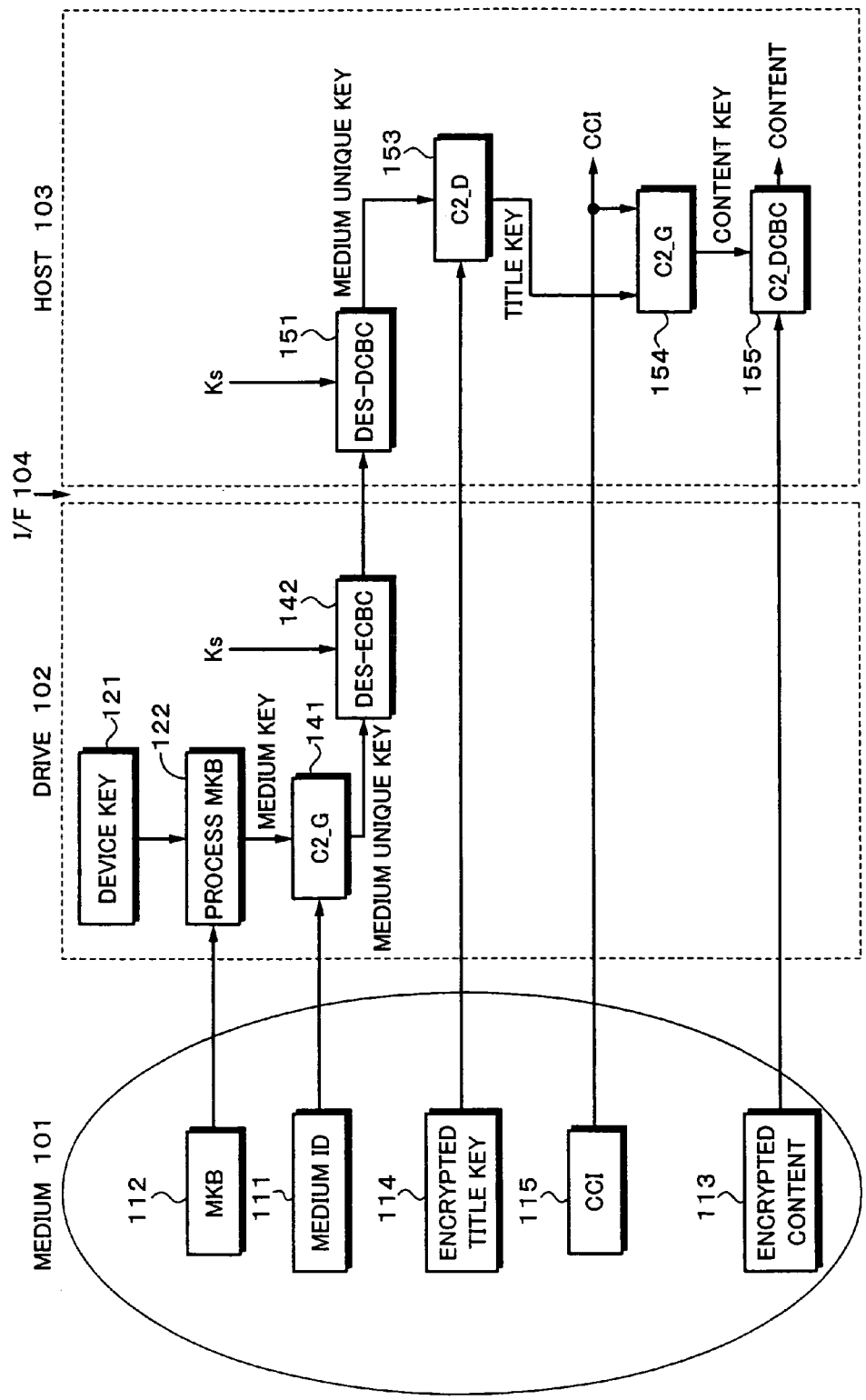
FIG. 10 is a block diagram showing an example of a structure of a player that integrates the drive and the host according to the embodiment of the present invention.

FIG. 10 shows a structure of a player that integrates a drive 102 and a host 103 that perform the foregoing mutual authentication according to an embodiment. The player according to the embodiment securely transfers a medium unique key calculated by the drive 102 to the host 103 using a session key Ks generated as a result of the mutual authentication of a medium unique key calculated by the drive 102. The host 103 decrypts an encrypted title key using the medium unique key and decrypts a content using a content key obtained using the title key and a CCI 115.

The drive 102 that composes the player has structural elements of a device key 121, a process MKB 122, a C2_G2 141, and a DES encryptor 142. The process MKB 122 calculates an MKB 112 reproduced from a medium 101 and the device key 121. As a result, it is determined whether or not the drive 102 has been revoked. The process MKB 122 obtains a medium key using the MKB 112 and the device key 121.

The C2_G 141 is a process for calculating a medium key and a medium ID 111 and obtaining a medium unique key. The DES encryptor 142 encrypts the medium unique key using a session key Ks. In this example, as an encrypting system, DES CBS mode is used. An output of the DES encryptor 142 is transmitted to a DES descriptor 151 of the host 103.

In the host 103, the DES descriptor 151 decrypts the medium unique key using a session key Ks. The medium unique key and an encrypted title key 114 are supplied to a C2_D 153. The C2_D 153 decrypts the encrypted title key using the medium unique key. The decrypted title key and a CCI 115 reproduced from the medium 101 are supplied to a C2_G 154. The C2_G 154 obtains a content key. A C2 decryptor 155 decrypts an encrypted content 113 reproduced from the medium 101 using the content key and obtains the content key.

Figure 11:
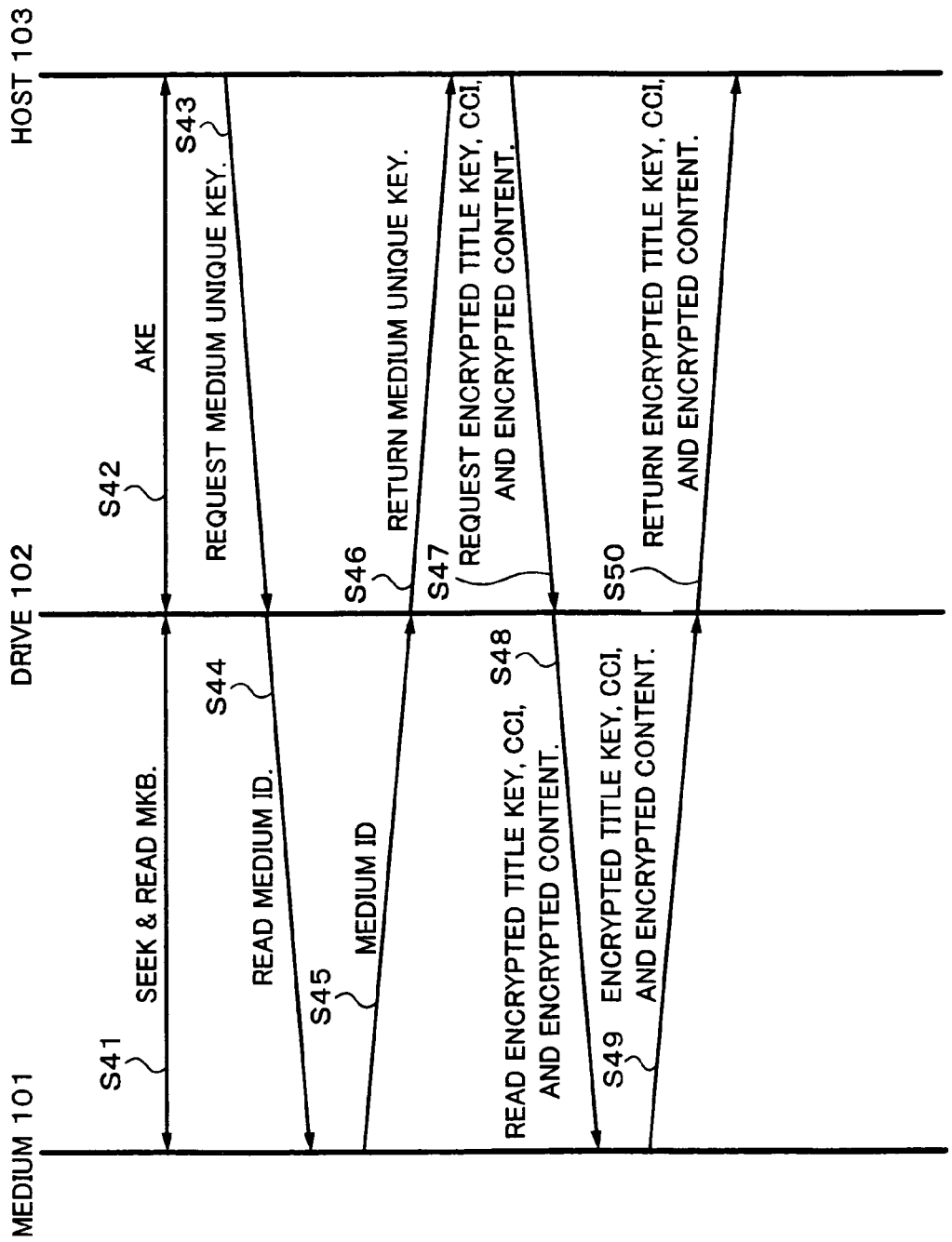
FIG. 11 is a schematic diagram describing an example of steps of a communicating procedure of the player.

FIG. 11 shows steps of a content reproducing procedure. First of all, the drive 102 seeks an MKB from the medium 101 in accordance with a request from the host 103 and reads the MKB therefrom (at step S41). An MKB is read for each pack. At step S42, AKE is performed. In other words, the foregoing revoking process and mutual authenticating operation of the drive 102 and the host 103 are preformed.

When the mutual authentication has not been successfully performed, a rejecting process is performed and for example the subsequence process is stopped. When the mutual authentication has been successfully performed, the drive 102 and the host 103 generate a session key Ks and share it.

At step S43, the host 103 requests the drive 102 for a medium unique key. The drive 102 seeks a medium ID of the medium 101 (at step S44). The drive 102 reads the medium ID from the medium 101 (at step S45). The drive 102 calculates the medium key and a medium ID and generates a medium unique key. At step S46, the medium unique key is encrypted using the session key Ks. The encrypted medium unique key is transferred to the host 103.

Thereafter, at step S47, the host 103 requests the drive 102 for an encrypted title key, a CCI, and an encrypted content. At step S48, the drive 102 reads an encrypted title key 114, a CCI 115, and an encrypted content 113 from the medium 101. At step S49, the drive 102 reads the encrypted title key 114, the CCI 115, and the encrypted content 113. At step S50, the drive 102 transfers the encrypted title key 114, the CCI 115, and the encrypted content 113 to the host 103.

The host 103 decrypts the title key and obtains a content key using the title key and the CCI 115. The host 103 decrypts the encrypted content using the content key.

In the player having the structure shown in FIG. 10, the host 103 has the decryptor C2_D 153 that decrypts an encrypted title key. Alternatively, the drive 102 may have a decryptor that decrypts an encrypted title key. In this case, a decrypted title key is securely transferred to the C2_G 154 of the host 103. The C2_G 154 generates a content key. Alternatively, the drive 102 may have the content key generating device C2_G so as to generate the content key using the decrypted title key and the CCI. In this case, the decrypted content key is securely transferred to the C2 decryptor 155 of the host 103.

Next, with reference to FIG. 12 and FIG. 13, a recorder and a player according to another embodiment of the present invention will be described. In the embodiment, a medium unique key is generated by the drive. A parameter with which a content key is generated is used (a system of which the CPRM is extended).

In the system of which the CPRM is extended, a parameter A with which a medium unique key is calculated and a parameter B for which an encrypting/decrypting process is performed are used. The parameters A and B may be recorded on the host side, on the drive side, or recorded on a medium and read by the host. When the parameters. A and B are sent and received through an interface, they may be encrypted so as to securely transfer them.

Figure 12:
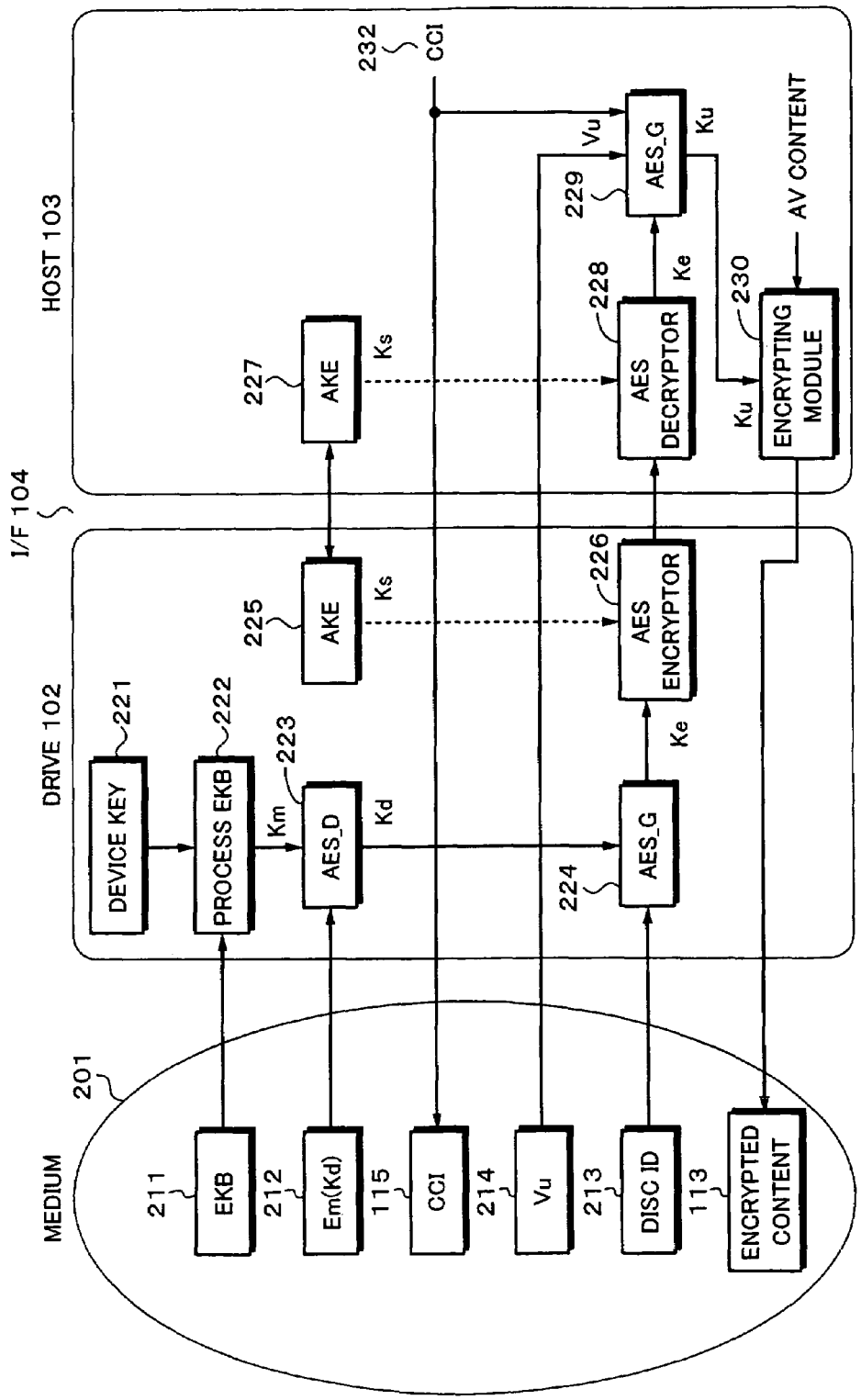
FIG. 12 is a block diagram showing an example of a structure of a recorder that integrates a drive and a host according to another embodiment of the present invention.

FIG. 12 shows a structure of the recorder according to the embodiment. In FIG. 12, reference numeral 201 represents a recordable medium. On the medium 201, an EKB 211, en encrypted disc key Em(Kd) 212, a disc ID 213, and a unit key generation value Vu 214 are pre-recorded.

Next, terminology of key information shown in FIG. 12 will be described.

The EKB 211 is a key bundle of which a medium key is distributed to each device key. The EKB 211 corresponds to a medium key block MKB according to the foregoing embodiment.

A medium key Km is key information unique to each medium. When a medium key is not found from the EKB, it represents that the device key has been revoked.

A disc key Kd is key information that differs in at least each content. A disc key Kd may differ in each master disc. The encrypted disc key Em(Kd) 212 is an encryption key of which a disc key Kd is encrypted with a medium key Km. The encrypted disc key Em(Kd) 212 is recorded on the medium 201. The encrypted disc key Em (Kd) 212 is used for the drive 102 to generate an embedded key Ke that differs in each medium.

The unit key generation value Vu 214 is a parameter that can be defined in each encrypted unit. Each encrypted unit is composed of data of a plurality of sectors. The unit key generation value Vu 214 is used for the host 103 to generate a unit key Ku as an encryption key with which a content is encrypted.

The disc ID 213 is an ID that doffers in each stamper. The disc ID 213 corresponds to the medium ID 111 of the foregoing embodiment.

The embedded key Ke is key information that differs in each medium. The embedded key Ke corresponds to the medium unique key according to the foregoing embodiment.

A process EKB 222 obtains a medium key Km using a device key 221 of the drive 102 and the EKB 211 of the medium 201. An AES_D 223 decrypts a disc key Kd using the medium key Km and the encrypted disc key Em(Kd) 212 of the medium 201. An AES_G 224 obtains an embedded key Ke using the disc key Kd and the disc ID 213.

The unit key Ku is a key with which a content is encrypted. The unit key Ku is obtained using the embedded key Ke, the unit key generation value Vu, and copy control information CCI 232. The unit key Ku corresponds to the content key of the foregoing embodiment.

Next, the operation of the recorder according to the other embodiment will be described.

First of all, AKEs 225 and 227 authenticate each other. When they have successfully authenticated each other, they generates a session key Ks. A parameter for the authentication (not shown in FIG. 12) is supplied to at least one of the AKEs 225 and 227.

The drive 102 reads the EKB 211 from the medium 201. The process EKB 222,of the drive 102 calculates the EKB 211 of the medium 201 and the device key 221 and obtains the medium key Km. When the calculated result is for example 0, the device key is revoked. The device key 221 of the drive 102 is a key unique to each drive model.

The drive 102 reads the encrypted disc key Em(Kd) 212 from the medium 201. The AES_D 223 obtains the disc key Kd using the medium key Km. The AES (Advanced Encryption Standard) is an encrypting method that the United States Government has employed as a new encrypting standard that is a successor of the DES.

In addition, the drive 102 reads the disc ID 213 from the medium 201. The AES_G 224 calculates the disc ID and the disc key Kd and obtains the embedded key Ke.

After the authentication of the drive 102 and the host 103 have successfully performed and the session key Ks has been obtained, the host 103 requests the drive 102 for the embedded key Ke.

When the drive 102 transfers Ke to the host 103 through the interface 104, the AES encryptor 226 encrypts Ke using the session key Ks. The host 103 causes the AES decryptor 228 to decrypt the encrypted Ke and obtains Ke. The AES encryptor 226 and the AES decryptor 228 perform a process of for example CBC (Cipher Block Chaining) mode.

The host 103 process the content in each encrypted unit. The host 103 reads the unit key generation value Vu 214 as the encrypted unit from the drive 102. The AES_G 229 calculates the unit key Ku using the embedded key Ke, the unit key generation value Vu 214, and the CCI 232. Since the unit key Ku is generated using the CCI 232, copyright of the content can be more securely protected.

The host 103 causes the encrypting module 230 to encrypt the content using the unit key Ku. The encrypted content 113 is transferred to the drive 102. The encrypted content 113 is recorded to the recordable medium 201.

Next, with reference to FIG. 13, a player according to the other embodiment of the present invention will be described. The player reproduces data from a ROM type medium 210 for example a ROM disc.

A content is pre-recorded on the ROM type medium 210. A host 103 does not need to perform an encrypting process. The host 103 uses a decrypting module 231. An encrypted content is read from the medium 210 and decrypted by the decrypting module 231. As a result, an AV content is obtained.

In the case of the ROM type medium 210, a medium key Km and a disc key Kd are key information unique to each content. Each content is composed of at least one encrypted unit.

An embedded key generation value Ve 215 is pre-recorded on the medium 210. The embedded key generation value Ve 215 is a non-zero value recoded for each stamper (which is a disc original of which photo resist is developed or a first stamper produced using a disc original). The embedded key generation value Ve 215 is recorded as a physical watermark on the disc by other than the regular data recording means.

An embedded key Ke corresponds to the medium unique key of the foregoing embodiment. The embedded key generation value Ve 215 for generating the embedded key Ke is a kind of a medium ID.

Figure 13:
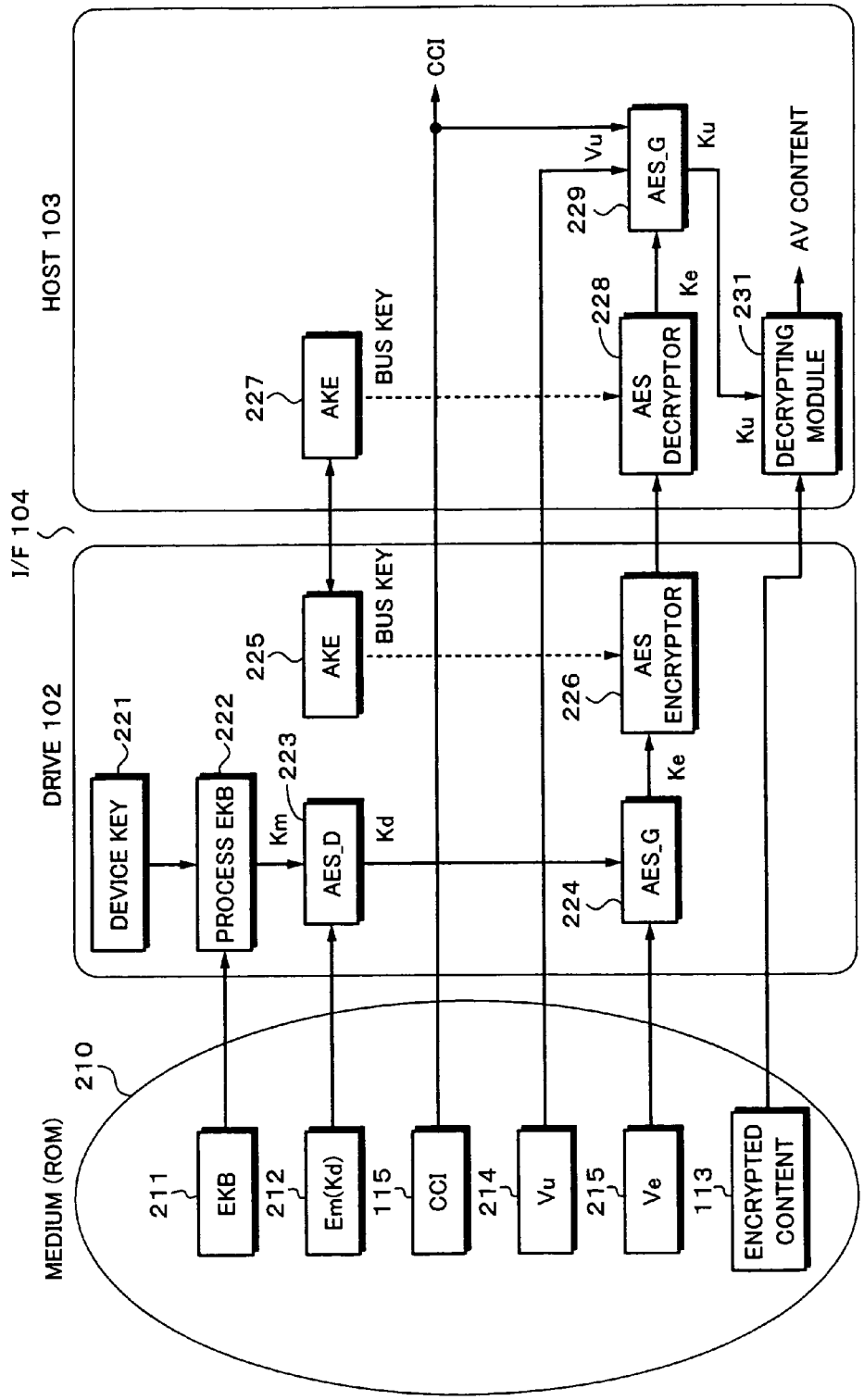
FIG. 13 is a block diagram showing an example of a structure of a player that integrates the drive and the host according to the other embodiment of the present invention.

The recorder shown in FIG. 13 performs a process similar to the player shown in FIG. 12. First, AKEs 225 and 227 authenticate each other and generate a session key Ks. A process EKB 222 of the drive 102 calculates an EKB 211 and a device key 221 that have been read, obtains a medium key Km, and performs a revoking process. An AES_D 223 decrypts a disc key Kd using the medium key Km. An AES_G 224 obtains an embedded key Ke.

An AES encryptor 226 encrypts Ke using a session key Ks. The host 103 causes an AES decryptor 228 to decrypt the encrypted Ke and obtains Ke.

The host 103 reads a unit key generation value Vu 214 of an encrypted unit to be read and copy control information CCI from the drive 102. An AES_G 229 calculates a unit key Ku.

A decrypting module 231 of the host 103 decrypts sector data of the encrypted unit requested by the host 103 using the unit key Ku of the encrypted unit.

According to the present invention, since information unique to an electronic device or application software for example a device key as secret information of a copyright protection technology is implemented in a recording and reproducing apparatus, application software that is installed in a DVD processing apparatus does not need to have secret information of a copyright protection technology. Thus, the software can withstand an analysis using reverse engineering. As a result, the safety of the copyright protection technology can be secured.

A device key that is information unique to an electronic apparatus or application software is divided into two portions that are shared by the recording and reproducing apparatus and the data processing apparatus. Thus, both the recording and reproducing apparatus and the application software can be revoked.

According to the present invention, a part of an algorithm of a copyright protection technology, for example a calculating portion for a medium unique key is implemented in the recording and reproducing apparatus. Thus, the application software of the data processing apparatus needs to have only a part of the algorithm. As a result, the software is capable of withstanding an analysis using reverse engineering. Consequently, the safety of the copyright protection technology can be secured.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention. For example, a title key is a key for each title. However, according to the present invention, as long as the title key is random number information, the title key does not need to differ in each title.

The foregoing description exemplifies the CPRM as a copyright protection technology and an extended CPRM. However, the present invention can be applied to other than the CPRM as a copyright protection technology. For example, the present invention can be applied to a copyright protection technology based on a tree-type key distribution structure as proposed in for example Japanese Patent Laid-Open Publication No. 2001-352322. In addition, the present invention can be applied to a PC based system. However, it should be noted that the present invention is not limited to a structure of which a PC and a drive are combined. For example, the present invention can be applied to a portable moving picture or still picture camera having an optical disc as a medium, a drive that drives the medium, and a microcomputer that controls the drive.

According to the present invention, the reproducing apparatus side generates a content key. The content key is transmitted to the information processing apparatus. The information processing apparatus side encrypts a content using the content key. Since the reproducing apparatus generates key information with which copyright of a content is protected, the content key can be generated by hardware. As a result, tamper-resistance for secret information is improved. In addition, since the reproducing apparatus generates a random number as an intermediate key, a true random number or a random number close thereto can be generated by hardware for example an LSI in the reproducing apparatus. Thus, it becomes difficult to replace a generated random number with a fixed value. As a result, according to the present invention, it is not necessary for application software installed in the information processing apparatus to have all secret information of a copyright protection technology. Thus, the system according to the present invention is capable of having tamper-resistance for secret information against reverse-engineering for software and securing safety of the copyright protection technology. In addition, since encrypted data that is read from the disc can be prevented from being decrypted by decrypting software such as "DeCSS" and non-encrypted clear content from being repeatedly copied without copy restriction. Thus, safety of the copyright protection technology can be secured.

Since the recording and reproducing apparatus has a device key as information unique to an electronic device, the recording and reproducing apparatus itself can be revoked. According to the present invention, since random number information necessary for calculating a content key in the information processing apparatus can be generated by for example an LSI in the recording and reproducing apparatus, a true random number or a random number close thereto can be generated in comparison with the case that a random number is generated by software in a PC. Thus, the risk of which a random number is replaced with a fixed value can be suppressed.

The invention claimed is:

1. A signal processing system having a reproducing apparatus for reading information from a recording medium having unique information and an information processing apparatus for mutually authenticating and connecting the reproducing apparatus through a transferring portion, wherein the reproducing apparatus comprises:
a final encryption key generating portion configured to generate a content information encryption key in accordance with intermediate key information;
a first transmitting portion configured to transmit the intermediate key information to the information processing apparatus through the transferring portion; and
a second transmitting portion configured to transmit the content information encryption key to the information processing apparatus through the transferring portion, and wherein the information processing apparatus comprises:
a content information encrypting portion configured to encrypt content information using the content information encryption key;
an intermediate key information encrypting portion configured to encrypt the intermediate key information using key information unique to the recording medium, the key information being generated in accordance with the information unique to the recording medium and a device key unique to the information processing apparatus; and
a recording portion configured to record the encrypted content information and the encrypted intermediate key information to the recording medium.

2. The signal processing system as set forth in claim 1,
wherein the reproducing apparatus further comprises a random number generating portion configured to generate a random number, and
wherein the intermediate key information includes the random number generated by the random number generating portion.

3. A recording method of a reproducing apparatus and an information processing apparatus for recording information to a recording medium, the reproducing apparatus being configured to read information from the recording medium having information unique thereto and the information processing apparatus being configured to mutually authenticate and connect the reproducing apparatus through a transferring portion, the recording method comprising the steps of:
causing the reproducing apparatus to generate a content information encryption key in accordance with intermediate key information;
causing the reproducing apparatus to transmit the intermediate key information to the information processing apparatus through the transferring portion;
causing the reproducing apparatus to transmit the content information encryption key to the information processing apparatus through the transferring portion;
causing the information processing apparatus to encrypt content information using the content information encryption key;
causing the information processing apparatus to encrypt the intermediate key information using key information unique to the recording medium, the key information being generated in accordance with information unique to the recording medium and a device key unique to the information processing apparatus; and
causing the information processing apparatus to record the encrypted content information and the encrypted intermediate key information to the recording medium.

4. The recording method as set forth in claim 3, further comprising the step of:
causing the reproducing apparatus to generate a random number, wherein the intermediate key information includes the random number.

5. A computer readable medium storing a computer program which when executed by a computer causes the computer to control a reproducing apparatus and an information processing apparatus for recording information to a recording medium, the reproducing apparatus being configured to read information from the recording medium having information unique thereto and the information processing apparatus being configured to mutually authenticate and connect the reproducing apparatus through a transferring portion, the computer program causing the computer to execute steps comprising:
  causing the reproducing apparatus to generate a content information encryption key in accordance with intermediate key information;
  causing the reproducing apparatus to transmit the intermediate key information to the information processing apparatus through the transferring portion;
  causing the reproducing apparatus to transmit the content information encryption key to the information processing apparatus through the transferring portion;
  causing the information processing apparatus to encrypt content information using the content information encryption key;
  causing the information processing apparatus to encrypt the intermediate key information using key information unique to the recording medium, the key information being generated in accordance with information unique to the recording medium and a device key unique to the information processing apparatus; and
  causing the information processing apparatus to record the encrypted content information and the encrypted intermediate key information to the recording medium.

6. The computer readable medium as set forth in claim 5, further comprising:
  causing the reproducing apparatus to generate a random number,
  wherein the intermediate key information includes the random number.

7. A reproducing apparatus, connected to an information processing apparatus through a transferring portion, for reading information from a recording medium having information unique thereto, the reproducing apparatus comprising:
  a final encryption key generating portion configured to generate a content information encryption key in accordance with intermediate key information;
  a first transmitting portion configured to transmit the intermediate key information to the information processing apparatus through the transferring portion;
  a second transmitting portion configured to transmit the content information encryption key to the information processing apparatus through the transferring portion,
  wherein the reproducing apparatus is mutually authenticated with the information processing apparatus and connected thereto, the information processing apparatus comprising a content information encrypting portion configured to encrypt content information using the content information encryption key; an intermediate key information encrypting portion configured to encrypt the intermediate key information using key information unique to the recording medium, the key information being generated in accordance with information unique to the recording medium and a device key unique to the information processing apparatus; and a recording portion configured to record the encrypted content information and the encrypted intermediate key information to the recording medium.

8. The reproducing apparatus as set forth in claim 7, further comprising:
  a random number generating portion configured to generate a random number, and
  wherein the intermediate key information includes the random number generated by the random number generating portion.

9. An information processing apparatus connected to a reproducing apparatus through a transferring portion, the reproducing apparatus being configured to read information from a recording medium having unique information, the information processing apparatus being mutually authenticated with the reproducing apparatus and connected thereto through the transferring portion, the reproducing apparatus comprising a final encryption key generating portion configured to generate a content information encryption key in accordance with intermediate key information; a first transmitting portion configured to transmit the intermediate key information to the information processing apparatus through the transferring portion; and a second transmitting portion configured to transmit the content information encryption key to the information processing apparatus through the transferring portion, the information processing apparatus comprising:
  a content information encrypting portion configured to encrypt content information using the content information encryption key;
  an intermediate key information encrypting portion configured to encrypt the intermediate key information using key information unique to the recording medium, the key information being generated in accordance with information unique to the recording medium and a device key unique to the information processing apparatus; and
  a recording portion configured to record the encrypted content information and the encrypted intermediate key information to the recording medium.

10. The information processing apparatus as set forth in claim 9,
  wherein the reproducing apparatus further comprises a random number generating portion configured to generate a random number, and
  wherein the intermediate key information includes the random number generated by the random number generating portion.

11. A reproducing apparatus, comprising:
  at least one of a recording portion configured to record encrypted data to a recording medium having pre-recorded first information for invalidating an illegal electronic device, second information that differs in each content, third information definable for each encrypted unit, and identification data that differs in each stamper and a reproducing portion configured to reproduce encrypted data recorded on the recording medium;
  a storing portion configured to store fourth information unique to a valid electronic device or application software;
  a revoking processing portion configured to determine whether the fourth information is information unique to a valid electronic device or application software using the first information and the fourth information;
  a calculating portion configured to obtain intermediate key information unique to each recording medium using the first information, the fourth information, the second information, and the identification data when the determined result of the revoking processing portion represents that the fourth information is information unique to a valid electronic device or application software; and a transmitting portion configured to transmit the intermediate key information to the final encryption key generating portion of an information processing apparatus through a transferring portion.

12. The recording and reproducing apparatus as set forth in claim 11, further comprising:

an authenticating portion configured to mutually authenticate a data processing apparatus configured at least to encrypt data or to decrypt encrypted data using a key generated in accordance with the intermediate key information; and an intermediate key information encrypting portion configured to encrypt the intermediate key information using a session key generated when the authentication has been successfully performed and to transmit the encrypted intermediate key information to the data processing apparatus.

13. A data processing apparatus, comprising:

an authenticating portion configured to authenticate a recording and reproducing apparatus, the recording and reproducing apparatus having fourth information unique to a valid electronic device or application software, and configured at least to record encrypted data to a recording medium having pre-recorded first information for invalidating an illegal electronic device, second information that differs in each content, third information definable for each encrypted unit, and identification data that differs in each stamper or to reproduce encrypted data recorded on the recording medium;

a key information decrypting portion configured to receive the first information, the fourth information, and intermediate key information from the recording and reproducing apparatus and to decrypt the intermediate key information, the first information and the fourth information having been encrypted using a session key generated when the authentication has been successfully performed, the intermediate key information being unique to each recording medium and generated using the second information and the identification data;

a final encryption key generating portion configured to generate a final encryption key using the third information received from the recording and reproducing apparatus and the decrypted intermediate key information; and an encrypting and decrypting portion configured at least to encrypt data using the final encryption key or to decrypt data using the final encryption key.

* * * * *